(12) United States Patent
Peris Urquijo et al.

(10) Patent No.: US 12,527,320 B2
(45) Date of Patent: Jan. 20, 2026

(54) FORMULATION OF INSECTICIDES COMPRISING GLYCOL ETHER SOLVENTS

(71) Applicant: Bayer Aktiengesellschaft, Leverkusen (DE)

(72) Inventors: Gorka Peris Urquijo, Cologne (DE); Pierre Philippe Haas, Leverkusen (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 955 days.

(21) Appl. No.: 17/767,794

(22) PCT Filed: Oct. 8, 2020

(86) PCT No.: PCT/EP2020/078341
§ 371 (c)(1),
(2) Date: Apr. 8, 2022

(87) PCT Pub. No.: WO2021/074013
PCT Pub. Date: Apr. 22, 2021

(65) Prior Publication Data
US 2023/0055199 A1 Feb. 23, 2023

(30) Foreign Application Priority Data
Oct. 10, 2019 (EP) .................................. 19202553

(51) Int. Cl.
*A01N 25/02* (2006.01)
*A01N 25/30* (2006.01)
*A01N 33/12* (2006.01)
*A01N 43/36* (2006.01)
*A01N 47/06* (2006.01)

(52) U.S. Cl.
CPC ............ *A01N 25/02* (2013.01); *A01N 25/30* (2013.01); *A01N 33/12* (2013.01); *A01N 43/36* (2013.01); *A01N 47/06* (2013.01)

(58) Field of Classification Search
CPC ........ A01N 25/02; A01N 25/30; A01N 33/12; A01N 43/36; A01N 47/06
See application file for complete search history.

(56) References Cited

U.S. PATENT DOCUMENTS

| | | | |
|---|---|---|---|
| 8,133,850 B2 | 3/2012 | Patel et al. | |
| 8,247,351 B2 | 8/2012 | Fischer et al. | |
| 8,889,592 B2 | 11/2014 | Fischer et al. | |
| 2004/0157745 A1 | 8/2004 | Vermeer et al. | |
| 2007/0066489 A1 | 3/2007 | Vermeer et al. | |
| 2010/0179228 A1* | 7/2010 | Vermeer | A01N 25/04 514/783 |
| 2011/0086762 A1 | 4/2011 | Fischer et al. | |
| 2011/0086848 A1* | 4/2011 | Stork | A01N 25/30 514/342 |
| 2011/0190493 A1* | 8/2011 | Bretschneider | A01N 43/12 548/410 |
| 2011/0281727 A1 | 11/2011 | Fischer et al. | |
| 2011/0294783 A1 | 12/2011 | Fischer et al. | |
| 2018/0035666 A1 | 2/2018 | Stork et al. | |

FOREIGN PATENT DOCUMENTS

| | | |
|---|---|---|
| CN | 101568522 A | 10/2009 |
| CN | 101951761 A | 1/2011 |
| EP | 2193712 A1 | 6/2010 |
| JP | 2004534081 A | 11/2004 |
| JP | 2010529058 A | 8/2010 |
| JP | 2010539203 A | 12/2010 |
| JP | 2018525386 A | 9/2018 |
| TW | 226961 B | 7/1994 |
| TW | 201008489 A | 3/2010 |
| WO | 2003/000053 A1 | 1/2003 |
| WO | 2007/068428 A2 | 6/2007 |
| WO | 2008067873 A1 | 6/2008 |
| WO | 2008/151725 A1 | 12/2008 |
| WO | 2009/004281 A2 | 1/2009 |
| WO | 2009/115262 A1 | 9/2009 |
| WO | 2009106247 A1 | 9/2009 |
| WO | 2010003499 A2 | 1/2010 |
| WO | 2011/029552 A2 | 3/2011 |
| WO | 2011/131623 A1 | 10/2011 |
| WO | 2016/008696 A1 | 1/2016 |
| WO | 2017025582 A1 | 2/2017 |

OTHER PUBLICATIONS

PCT International Search Report for PCT/EP2020/078341, mailed Nov. 19, 2020.

* cited by examiner

*Primary Examiner* — Michael P Cohen
(74) *Attorney, Agent, or Firm* — Alexandria Quezada; Gale Wesley Starkey

(57) ABSTRACT

The invention relates to insecticidal active ingredient formulations comprising at least one active ingredient or a combination of active ingredients in solid form having good storage stability at high and low temperatures and high active ingredient penetration, to a process for production thereof and to the use thereof for application of the active ingredients present.

14 Claims, 1 Drawing Sheet

X-ray diffraction pattern of I-2 (Mod. A)
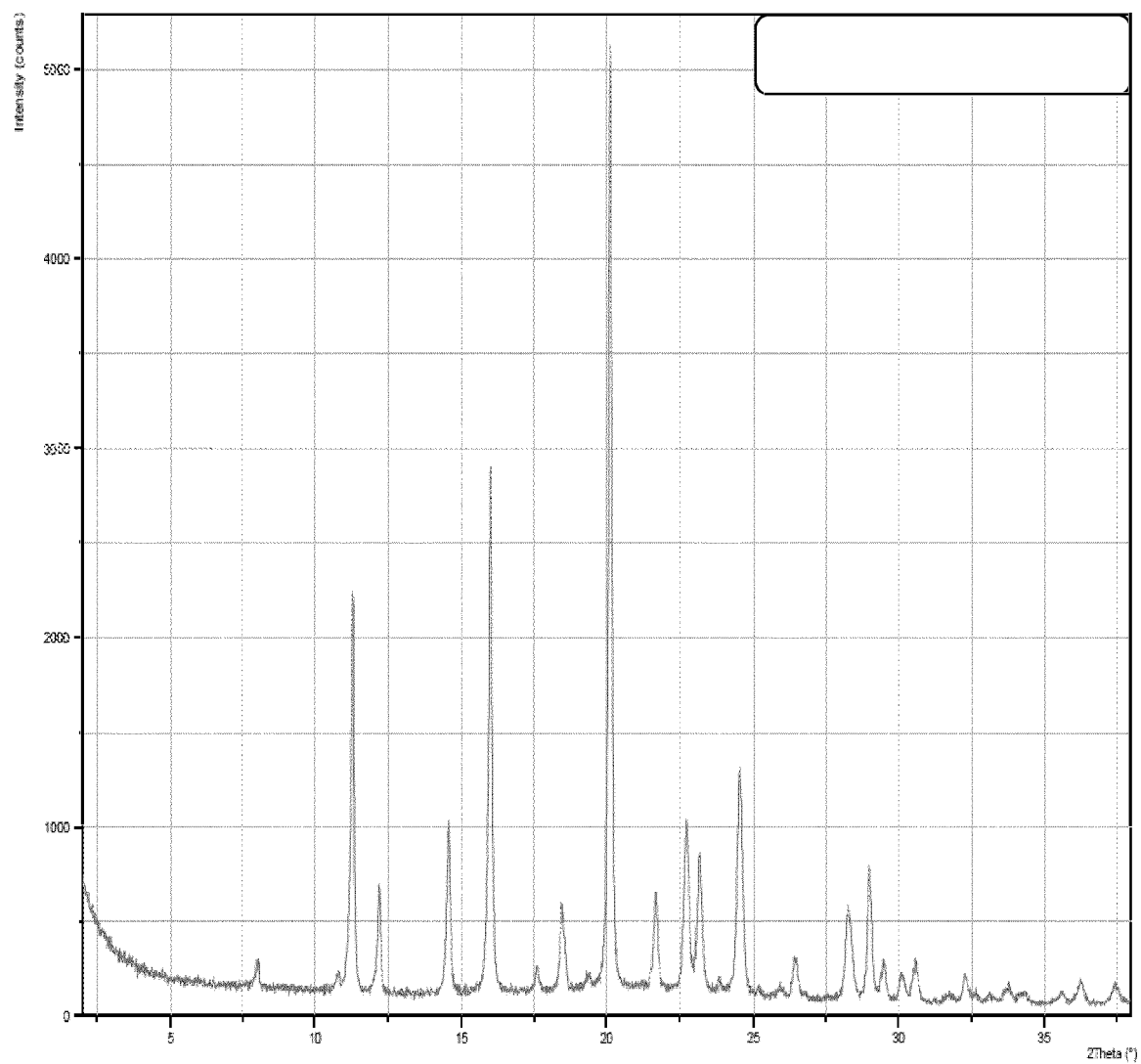

FORMULATION OF INSECTICIDES COMPRISING GLYCOL ETHER SOLVENTS

CROSS-REFERENCE TO RELATED APPLICATIONS

This application is the National Stage entry of International Application No. PCT/EP2020/078341, filed 8 Oct. 2020, which claims priority to European Patent Application No. 19202553.4, filed 10 Oct. 2019.

BACKGROUND

Field

The invention relates to insecticidal active ingredient formulations comprising an active ingredient or a combination of active ingredients in solid form having good storage stability at high and low temperatures and high active ingredient penetration resulting in high efficacy, to a process for production thereof and to the use thereof for application of the active ingredients present. The present invention further relates to adjuvant combinations for insecticidal active ingredient formulations having an active ingredient or a combination of active ingredients in solid form for improving the penetration of an active ingredient or a combination of active ingredients.

Description of Related Art

To display biological efficacy, systemic active agrochemical ingredients, especially systemic insecticides, need a formulation which enables uptake of the active ingredients into the plants/the target organisms. The best effect can be achieved in that the corresponding active ingredients are either diluted in aqueous solution for use and/or are already preferably in the dissolved state in the concentrate, such that a high active ingredient concentration is available at any time.

This is the case whenever active ingredients or active ingredient combinations are formulated as an emulsion concentrate (EC) or soluble liquid (SL), whereas the availability of dissolved and suspended active ingredients is limited via the dissolution equilibrium.

Furthermore, biological activity can optionally be increased further by adding suitable adjuvants/penetrants.

As mentioned above, in formulations such as suspension concentrates (SC) and/or oil-based suspension concentrates (OD), the active ingredients or active ingredient combinations are not in dissolved form but in solid, particulate form, and so these active ingredients in the formulations typically do not have good bioavailability. It is possible here to increase biological activity essentially only by addition of suitable adjuvants/penetrants, but this, by comparison with the above-described EC or SL formulations, nevertheless leads to reduced biological activity.

It is known that active agrochemical ingredients differ from one another in aspects including their physicochemical properties, for example solubility in water, solvents and/or oils, melting and boiling point, polarity, molar mass, etc. These properties affect the formulability of the active ingredients. Many known active agrochemical ingredients, for example, have a high melting point and can therefore withstand thermal stresses as occur, for example (caused by milling), in the production of suspension concentrates. By contrast, active ingredients having a low melting point are able to withstand these production conditions only with difficulty and can be produced as storage-stable suspensions only to a very limited degree since softening or melting of the active ingredient is to be expected at higher temperatures. However, if the active ingredient is no longer in crystalline form, the physical and sometimes chemical stability of the product formulated is often lowered significantly and it no longer has any practical utility.

It is additionally known that organic substances have different water solubilities, and these water solubilities, according to chemical characteristics, may be pH-dependent, for example through salt formation.

It is a feature of stable suspension concentrates that they are both physically and chemically storage-stable over a prolonged period (12-24 months) and over a wide temperature range (0 to 54° C.). This broad temperature range is required in order that, advantageously, just a single formulation with the same active ingredients or active ingredient combinations can be used in different climatic regions.

The storage stability of suspension concentrates is characterized in that, inter alia, containers of these suspension concentrates have only low phase separation, if any, over the period of storage. A further parameter for the stability of suspension concentrates is, for example, the stability of the dispersion in the concentrate, which is manifested in the presence or absence of agglomerates in the concentrate.

WO 2011/029552 describes alkyl polypropylene glycol-polyethylene glycol (e.g. Antarox B/848)-containing agrochemical formulations in which this surfactant class is used as emulsifier and/or penetrant for active agrochemical ingredients.

Furthermore, WO 2003/000053 describes particular alkyl polypropylene glycol-polyethylene glycols, for example Atlas G5000, as dispersant for organic crop protection products in oils.

The use of ammonium salts to enhance the action of active agrochemical ingredients is known in the literature; for example, WO 2011/131623 (US 2011/0281727 A1, Fischer et al.) describes insecticidal and/or herbicidal formulations based on heterocyclyl-based tetramic acids having improved efficacy in the presence of ammonium salts. Furthermore, WO 2007/068428 describes activity-enhancing effects of phenyl-substituted cyclic keto-enols in the presence of ammonium salts. WO 2011/131623 is directed to a combination of a single active ingredient selected from a group of substances of the formula [I] and an organic or inorganic ammonium or phosphonium salt, and to the use thereof in an aqueous spray liquor in the presence or absence of a suitable penetrant. Proceeding from the teaching of WO 2011/131623, the expert is unable to draw any conclusions as to formulations with combinations of further active ingredients, or to the physical and chemical stability of these mixture formulations. Suitable penetrants are described in broad terms in paragraphs [0111] to [0171] and generally claimed in [0178], but only rapeseed oil methyl ester is cited as an example of a vegetable oil derivative, and Genapol LRO as an example of an anionic alcohol ether sulfate.

A formulation having good penetration of an undissolved active ingredient according to the present invention is neither described or suggested in WO 2011/131623.

Oil-based formulations containing ammonium salts are likewise known in the literature. For example, WO 2008/151725 describes adjuvant compositions based on oils in which ammonium salts are in dispersed form. Furthermore, EP 2193712 A1 describes oil-based agrochemical formulations in which ammonium salts are in dispersed form. However, there is no description of suspensions of ammonium salts in water-miscible solvents.

In summary, however, none of the documents cited above, either individually or viewed jointly, gives a pointer that alkyl polypropylene glycol-polyethylene glycols, for example Antarox B/848, can be used as effective dispersants of inorganic ammonium salts at high loading in polar, water-soluble solvents, such as glycol ethers, especially in conjunction with suspended active ingredients.

Soluble water-based concentrates of tetramic acid derivatives are known from the prior art, for example from WO 2009/115262. Owing to solubility problems, these are not combinable with particular crop protection products and formulation ingredients. Furthermore, these water-based SL formulations generally have high pH values that likewise lead to incompatibility with particular base-sensitive crop protection products and formulation ingredients.

The problem addressed was thus that of developing a stable formulation that consists of a suspended active ingredient or a combination of suspended active ingredients, has good bioavailability and penetration capacity—of the suspended active ingredient or the combination of suspended active ingredients—, and has good storage stability both at high and low temperatures. The active ingredients are preferably insecticides.

SUMMARY

This problem was solved by the formulations described below comprising an active ingredient or an combination of active ingredients and an ammonium salt and a glycol ether as solvent.

The invention therefore provides insecticidal compositions comprising:
 a. at least one active ingredient solid at room temperature, which is preferably insoluble or slightly soluble in the chosen solvent f),
 b. at least one ammonium salt,
 c. at least one dispersant from the class of the alkyl propoxylate ethoxylates (e.g. according to formula III-a or III-d),
 d. optionally one or more surfactants,
 e. at least one water-insoluble filler,
 f. at least one solvent from the group of the glycol ethers, and
 g. optionally further adjuvants.

BRIEF DESCRIPTION OF THE DRAWINGS

FIG. 1 depicts embodiments as described herein.

DETAILED DESCRIPTION OF A PREFERRED EMBODIMENT

In a preferred embodiment, component d) is obligatory.
In a further preferred embodiment, component g) is obligatory.
In another embodiment components d) and g) are obligatory.
Further, the compositions in a preferred embodiment are free of water or essentially free of water.
It has been found in accordance with the invention that corresponding compositions have high stability.
In the present invention, in formulae, e.g. formula (I), optionally substituted radicals, unless stated otherwise, may be mono- or polysubstituted, where the substituents in the case of polysubstitutions may be the same or different.
Moreover, in ranges of preference stated in the present invention, the different levels of preference should be understood such that they can be combined with one another in permutations, but in any case identical levels of preference and especially the most preferred embodiment/level of preference in each case are to be combined with one another and are indeed disclosed as such a combination.

Compositions as described in the present application that consist solely of the essential components (not optional components) should likewise be considered to be disclosed.

Room temperature in the context of the present invention means, unless stated otherwise, a temperature of 20° C. to 25° C.

Components a-g are defined further hereinafter.

a. Active Ingredient Solid at Room Temperature

The active ingredient solid at room temperature is preferably selected from the group comprising insecticides, herbicides and fungicides. Further preferably, the active ingredients selected are insoluble or only slightly soluble in the chosen solvent f). Preference is further given to active insecticidal ingredients that are solid at room temperature and are insoluble or only slightly soluble in the chosen solvent f).

Slightly soluble or insoluble active ingredients in the context of the present invention are active ingredients that are solid at room temperature and have a solubility at 20° C. in the chosen solvent f) of preferably not more than 5 g/l, further preferably not more than 4 g/l, even further preferably not more than 2.5 g/l, and especially preferably not more than 1 g/l.

Even further preferably, the active ingredients are selected from the group comprising diamide insecticides (broflanilide, chlorantraniliprole, cyantraniliprole, cyclaniliprole, cyhalodiamide, flubendiamide, tetrachlorantraniliprole and tetraniliprole), spinosyns (IRAC group 5), what are called "mectins" (e.g. abamectin, emamectin benzoate, milbemectin; IRAC group 6), ethiprole, triflumuron, beta-cyfluthrin, deltamethrin and tetronic acid and tetramic acid derivatives (IRAC Group 23, including the compounds of formulae I and II specified below).

In a preferred embodiment, component a) in the compositions according to the invention is a keto-enol based on tetramic acids, preferably compounds of the formula (I)

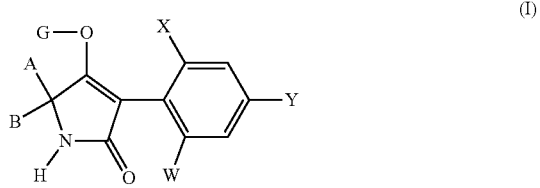

(I)

in which
 W and Y are independently hydrogen, $C_1$-$C_4$-alkyl, chlorine, bromine, iodine or fluorine,
 X is $C_1$-$C_4$-alkyl, $C_1$-$C_4$-alkoxy, chlorine, bromine or iodine,
 A, B and the carbon atom to which they are bonded are $C_3$-$C_6$-cycloalkyl substituted by an optionally $C_1$-$C_4$-alkyl- or $C_1$-$C_4$-alkoxy-$C_1$-$C_2$-alkyl-substituted alkylenedioxy group that forms a 5-membered or 6-membered ketal together with the carbon atom to which it is bonded,
 G is hydrogen (a) or is one of the groups

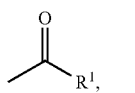
(b)

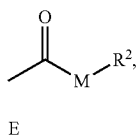
(c)

in which
E is a metal ion or an ammonium ion,
M is oxygen or sulfur,
$R^1$ is straight-chain or branched $C_1$-$C_6$-alkyl,
$R^2$ is straight-chain or branched $C_1$-$C_6$-alkyl.

Usable with particular preference are tetramic acid derivatives of the abovementioned formula (I) in which the radicals are defined as follows:
W is more preferably methyl,
X is more preferably chlorine or methyl (more preferably methyl),
Y is more preferably chlorine, bromine or methyl,
A, B and the carbon atom to which they are bonded are more preferably saturated $C_6$-cycloalkyl substituted by an alkylenedioxy group that forms a 5-membered or 6-membered ketal together with the carbon atom to which it is bonded,
G is more preferably hydrogen (a) or is one of the groups

(b)

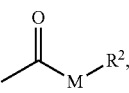
(c)

E,  (d)

in which
M is oxygen,
E is one metal ion equivalent or an ammonium ion (specifically sodium or potassium),
$R^1$ is more preferably straight-chain or branched $C_1$-$C_4$-alkyl,
$R^2$ is more preferably straight-chain or branched $C_1$-$C_4$-alkyl.

Specifically usable are tetramic acid derivatives of the abovementioned formula (I) with G=hydrogen (a).

Likewise specifically usable are tetramic acid derivatives of the abovementioned formula (I) with G=E (d).

Especially preferably usable are tetramic acid derivatives of the abovementioned formula (I) in which the radicals are defined as follows:

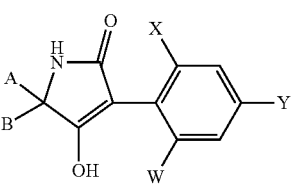
(I)

| Ex. No. | W | X | Y | A | B | known from WO 06/089633; Ex. No. |
|---|---|---|---|---|---|---|
| I-1 | $CH_3$ | $CH_3$ | $CH_3$ | —$(CH_2)_2$—C—$(CH_2)_2$— O—$(CH_2)_2$—O | | I-1-a-2 |
| I-2 | $CH_3$ | $CH_3$ | Cl | —$(CH_2)_2$—C—$(CH_2)_2$— O—$(CH_2)_2$—O | | I-1-a-4 |
| I-3 | $CH_3$ | $CH_3$ | Br | —$(CH_2)_2$—C—$(CH_2)_2$— O—$(CH_2)_2$—O | | I-1-a-26 |
| I-4 | $CH_3$ | $CH_3$ | $CH_3$ | —$(CH_2)_2$—C—$(CH_2)_2$— O—$(CH_2)_3$—O | | I-1-a-18 |
| I-5 | $CH_3$ | $CH_3$ | Cl | —$(CH_2)_2$—C—$(CH_2)_2$— O—$(CH_2)_3$—O | | I-1-a-14 |
| I-6 | $CH_3$ | $CH_3$ | Br | —$(CH_2)_2$—C—$(CH_2)_2$— O—$(CH_2)_3$—O | | I-1-a-19 |

In a particularly preferred embodiment, component a) is a compound of the formula

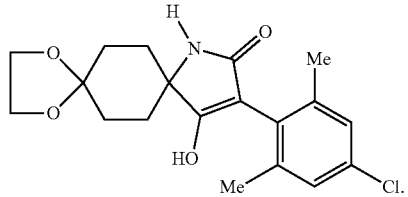

(I-2)

Compound I-2 is preferably used in the form of its most thermodynamically stable polymorphous structure. This crystal structure and further physical data were determined as follows:

Sample Preparation:

Compound I-2 ($C_{19}H_{22}ClNO_4$/MW=363.84 g/mol) was crystallized from methanol and dried at room temperature to obtain modification A.

Modification A of I-2 can be characterized by x-ray powder diffractometry based on the corresponding diffraction diagrams that have been recorded at 25° C. and with Cu-Kα 1 radiation (1.5406 Å) (FIG. 1).

Modification A according to the present invention exhibits at least 3, preferably at least 5, further preferably at least 7, even further preferably at least 10, and most preferably all the reflections as shown in FIG. 1:

Modification A according to the present invention is also characterized by the x-ray diffraction diagram shown in Figure I.

Crystallographic studies on single crystals of modification A showed that the crystal structure is monoclinic. The unit cell has the P2$_1$/c space group.

TABLE 2

Crystallographic properties of modification A

| Parameter | Modification A |
|---|---|
| Crystal system | Monoclinic |
| Space group | P2$_1$/c |
| a in Å | 11.66544(14) |
| b in Å | 9.50603(10) |
| c in Å | 16.66907(19) |
| α | 90 |
| β | 110.2045(13) |
| γ | 90 |
| Z | 4 |
| Density (calculated) | 1.393 g/cm³ | a, b, c = length of the sides of the unit cell
α, β, γ = angles of the unit cell
Z = number of molecules in the unit cell TABLEs 2a/b Crystallographic data/reflections [°2theta] of modification A

| 2a [°2theta] Modification A | 2b Reflections [°2theta] Modification A |
|---|---|
| 11.3 | 8.0 |
| 14.6 | 10.8 |
| 16.0 | 11.3 |
| 20.1 | 12.2 |
| 21.7 | 14.6 |
| 22.7 | 16.0 |
| 23.1 | 17.6 |
| 24.5 | 18.4 |
| 28.2 | 19.4 |
| 29.0 | 20.1 |
| | 21.7 |
| | 22.7 |
| | 23.1 |
| | 23.8 |
| | 24.5 |
| | 25.9 |
| | 26.4 |
| | 28.2 |
| | 29.0 |
| | 29.4 |
| | 30.1 |
| | 30.6 |
| | 32.2 |
| | 36.2 |
| | 37.4 |
| | 38.2 |
| | 39.1 |

The polymorphous form of modification A of I-1 can be determined by IR spectroscopy using the corresponding spectrum that has been recorded at 25° C. using a diamond ATR instrument at a resolution of 4 cm⁻. Modification A of the present invention exhibits at least 3, preferably at least 5, further preferably at least 7 and more preferably all bands as shown in Table 2c.

TABLE 2c)

IR bands [cm$^{-1}$]

| Band maxima [cm$^{-1}$] Modification A | Band maxima [cm$^{-1}$] |
|---|---|
| 3378 | 1133 |
| 2969 | 1109 |
| 2955 | 1088 |
| 2943 | 1045 |
| 2924 | 1036 |
| 2876 | 1027 |
| 2858 | 1015 |
| 2326 | 997 |
| 1637 | 980 |
| 1592 | 965 |
| 1575 | 946 |
| 1564 | 936 |
| 1470 | 903 |
| 1444 | 869 |
| 1438 | 856 |
| 1428 | 821 |
| 1394 | 783 |
| 1372 | 769 |
| 1344 | 748 |
| 1325 | 704 |
| 1317 | 691 |
| 1297 | 659 |
| 1272 | 639 |
| 1247 | 625 |
| 1194 | 573 |
| 1157 | 563 |
| | 553 |

In an alternative embodiment, component a) comprises tetramic acids of the formula (II)

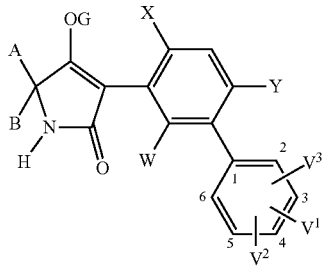
(II)

in which
W and Y are independently hydrogen, $C_1$-$C_4$-alkyl, chlorine, bromine, iodine or fluorine,
X is $C_1$-$C_4$-alkyl, $C_1$-$C_4$-alkoxy, chlorine, bromine or iodine,
$V^1$ is hydrogen, halogen, $C_1$-$C_6$-alkyl, $C_1$-$C_6$-alkoxy, $C_1$-$C_6$-alkylthio, $C_1$-$C_6$-alkylsulfinyl, $C_1$-$C_6$-alkylsulfonyl, $C_1$-$C_4$-haloalkyl, $C_1$-$C_4$-haloalkoxy, nitro or cyano,
$V^2$ is hydrogen, halogen, $C_1$-$C_6$-alkyl or $C_1$-$C_6$-alkoxy,
$V^3$ is hydrogen or halogen,
A, B and the carbon atom to which they are bonded are saturated $C_5$-$C_6$-cycloalkyl in which one ring member has been replaced by oxygen and which is optionally monosubstituted by $C_1$-$C_8$-alkyl, $C_1$-$C_8$-alkoxy or $C_1$-$C_6$-alkyloxy-$C_1$-$C_6$-alkyl,
G is hydrogen (a) or is one of the groups

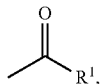
(b)

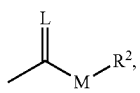
(c)

E,
(d)

in which
E is a metal ion or an ammonium ion,
L is oxygen or sulfur and
M is oxygen or sulfur,
$R^1$ is straight-chain or branched $C_1$-$C_6$-alkyl,
$R^2$ is straight-chain or branched $C_1$-$C_6$-alkyl.

Usable with particular preference are tetramic acid derivatives of the abovementioned formula (I) in which the radicals are defined as follows:
W is more preferably hydrogen or methyl,
X is more preferably chlorine or methyl,
Y is more preferably hydrogen,
$V^1$ is more preferably fluorine or chlorine (specifically fluorine or chlorine in the 4 position),
$V^2$ is more preferably hydrogen or fluorine (specifically fluorine in the 3 position),
$V^3$ is more preferably hydrogen or fluorine (specifically fluorine in the 5 position),
A, B and the carbon atom to which they are bonded are more preferably saturated $C_6$-cycloalkyl in which one ring member has been replaced by oxygen,
G is more preferably hydrogen (a) or is one of the groups

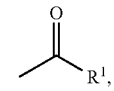
(b)

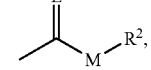
(c)

E,
(d)

in which
E is more preferably one metal ion equivalent or an ammonium ion (specifically sodium or potassium),
$R^1$ is more preferably straight-chain or branched $C_1$-$C_4$-alkyl,
$R^2$ is more preferably straight-chain or branched $C_1$-$C_4$-alkyl.

Specifically usable are tetramic acid derivatives of the abovementioned formula (I) with G=hydrogen (a).
Likewise specifically usable are tetramic acid derivatives of the abovementioned formula (I) with G=E (d).
Especially preferably usable are tetramic acid derivatives of the abovementioned formula (II) in which the radicals are defined as follows:

| Ex. No. | A B | W | X | Y | $V^1$ | $V^2$ | $V^3$ | G | known from WO 08/067911 |
|---|---|---|---|---|---|---|---|---|---|
| II-1 | —(CH$_2$)$_2$—O—(CH$_2$)$_2$— | H | Cl | H | 4-F | H | H | H | I-1-a-13 |
| II-2 | —(CH$_2$)$_2$—O—(CH$_2$)$_2$— | H | Cl | H | 4-F | 3-F | H | H | I-1-a-21 |
| II-3 | —(CH$_2$)$_2$—O—(CH$_2$)$_2$— | H | Cl | H | 4-F | 3-F | 5-F | H | I-1-a-30 |
| II-4 | —(CH$_2$)$_2$—O—(CH$_2$)$_2$— | H | CH$_3$ | H | 4-F | H | H | H | I-1-a-1 |
| II-5 | —(CH$_2$)$_2$—O—(CH$_2$)$_2$— | H | CH$_3$ | H | 4-F | 3-F | H | H | I-1-a-3 |
| II-6 | —(CH$_2$)$_2$—O—(CH$_2$)$_2$— | H | CH$_3$ | H | 4-F | 3-F | 5-F | H | I-1-a-28 |
| II-7 | —(CH$_2$)$_2$—O—(CH$_2$)$_2$— | CH$_3$ | CH$_3$ | H | 4-F | H | H | H | I-1-a-4 |
| II-8 | —(CH$_2$)$_2$—O—(CH$_2$)$_2$— | CH$_3$ | CH$_3$ | H | 4-F | 3-F | H | H | I-1-a-5 |
| II-9 | —(CH$_2$)$_2$—O—(CH$_2$)$_2$— | CH$_3$ | CH$_3$ | H | 4-F | 3-F | 5-F | H | I-1-a-25 |

In a particularly preferred alternative embodiment, a) is

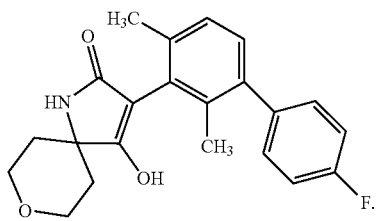
(II-7)

b. Ammonium Salt

The ammonium salt is preferably selected from the group comprising water-soluble inorganic ammonium salts.

Further preferably, b) is selected from the group comprising ammonium carbonate, ammonium hydrogensulfate, ammonium sulfate (AMS), ammonium hydrogencarbonate, ammonium carbonate and diammonium hydrogenphosphate (DAHP).

More preferably, b) is DAHP and AMS.

c. Dispersant

Component c) is preferably selected from the group which comprises alkyl polypropylene glycol-polyethylene glycol compound of the general formula (III-a)

R—O-A-B—H    (III-a)

where R is a C1-C4 fragment, preferably a C3-C4 fragment, more preferably a C4 fragment, A is a polypropylene glycol fragment consisting of 10 to 40 propylene oxide (PO) units (formula III-b), preferably consisting of 15-35 PO units, more preferably consisting of 20-30 PO units, B is a randomly copolymerized polyethylene glycol-polypropylene glycol fragment consisting of 10-50 ethylene oxide (EO) units (formula III-c) together with 0-10 propylene glycol (PO) units, preferably consisting of 20-40 EO units together with 0-8 PO units, more preferably consisting of 30-40 EO units together with 0-5 PO units.

formula III-b formula III-c

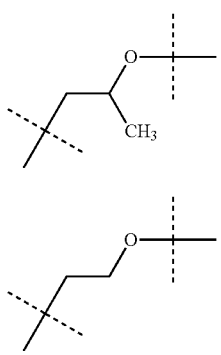

Examples of "alkyl polypropylene glycol-polyethylene glycol compounds" are:

| Trade name | Manufacturer |
|---|---|
| Antarox B/848 | Solvay |
| Antarox BL-470 | Solvay |

-continued

| Trade name | Manufacturer |
|---|---|
| Antarox BL-480 | Solvay |
| Atlas G 5000 | Croda |
| Atlas G 5002 | Croda |
| Emulsogen 3510 | Clariant |
| Emulsogen EP 4901 | Clariant |
| Ethylan NS 500 K | Akzo Nobel |
| Ethylan NS 500 LQ | Akzo Nobel |
| Ethylan NS 505 K | Akzo Nobel |
| Lucramul AG 411 | Levaco |
| Synergen 848 | Clariant |
| Termul 5429 | Huntsman |
| Tergitol XD | Dow |
| Toximul 8320 | Stepan |
| Toximul 8325 | Stepan |
| Ultraric 5000 | Oxiteno | and the compounds of the general formula (IIId)

R—O—$(C_mH_{2m}O)_x$—$(C_nH_{2n}O)_y$-R'    (IIId)

in which the individual radicals and indices have the following definitions:

R and R' are independently hydrogen, a linear $C_1$- to $C_5$-alkyl radical or a branched $C_3$- or $C_4$-alkyl radical;

m is 2 or 3;

n is 2 or 3;

x is 5 to 150; and y is 5 to 150, where one radical n or m has the meaning of 2 and the other radical n or m has the meaning of 3.

In the context of the present invention, a linear $C_1$- to $C_5$-alkyl radical is understood to mean a methyl radical, an ethyl radical, an n-propyl radical, an n-butyl radical or an n-pentyl radical.

In the context of the present invention, a branched $C_3$- to $C_4$-alkyl radical is understood to mean an isopropyl radical, an isobutyl radical or a tert-butyl radical.

In a preferred embodiment, the R and R' radicals are independently selected from the group consisting of a methyl radical, an n-butyl radical and hydrogen.

In an even more preferred embodiment, the R and R' radicals are independently selected from the group consisting of an n-butyl radical and hydrogen.

With regard to the arrangement of the polyethylene and polypropylene units, (a) either m may assume the value of 2 and n the value of 3;

(b) or m may assume the value of 3 and n the value of 2.

Preference is given to configuration (b) with m=3 and n=2.

Very particular preference is given to alkyl polypropylene glycol-polyethylene glycol compounds of the formula (IIId) in which m is 3, n is 2, x is 5 to 80, y is 5 to 80, R is n-butyl or hydrogen and R' is hydrogen.

d. Suitable Surfactants d) in the Context of the Present Invention are Selected from the Group Comprising:

d1) surfactants of the polycarboxylate type, for example those such as hydrophobically modified comb-like polymers, for example polyacrylic acid, polymethacrylic acid, polymaleic acid, polymaleic anhydride, a copolymer of maleic acid or maleic anhydride with an olefin (such as isobutylene or diisobutylene), a copolymer of acrylic acid and itaconic acid, a copolymer of methacrylic acid and itaconic acid, a copolymer of maleic acid or maleic anhydride and styrene, a copolymer of acrylic acid and methacrylic acid, a copolymer of acrylic acid and methacrylate, a copolymer of acrylic acid and vinyl acetate, a copolymer of styrene and methacrylic acid, modified copolymers of styrene and methacrylic acid, a copolymer of maleic acid or maleic anhydride and acrylic acid, an N-methyl fatty acid (e.g. $C_8$-$C_{18}$)-sarcosinate, a carboxylic acid such as a resin acid or a fatty acid (e.g. $C_8$-$C_{18}$) or a salt of such a carboxylic acid. The abovementioned copolymers may also be in the form of their salts, e.g. alkali metal salts (preferably Li, Na, K), alkaline earth metal salts (preferably Ca, Mg), ammonium or various amines Examples of those described above include Geropon T/36, Geropon TA/72, Tersperse 2700, Atlox Metasperse 550 S, Geropon Ultrasperse, Narlex D-72, Versa TL3 and Agrilan 789 Dry, and d2) surfactants selected from the group consisting of salts of sulfated formaldehyde condensation products with alkylaromatics, e.g. MORWET D-425 (from Akzo Nobel); OPARYL DT 120, OPARYL DT 201, OPARYL DT 530 (from Bozzetto); TERSPERSE 2020 (from Huntsman) and salts of sulfated formaldehyde condensation products with ditolyl ether (e.g. BAYKANOL SL, from Levaco) and salts of sulfated formaldehyde condensation products with cyclohexanone (e.g. LUCRAMUL DAC 210, from Levaco), and d3) surfactants selected from the group of the lignosulfonates and salts thereof, preferably selected from the group of lignosulfonates and salts thereof consisting of Borrespersе NA, Borrespersе 3A, Ultrazine NA, Ufoxane 3A, Vanisperse CB, Marasperse AG, MARASPERSE N 22, MARASPERSE C 21, MARASPERSE CBOS-4, WAFEX CA122 and Borrespersе CA from Borregaard; KRAFTSPERSE EDF-350, KRAFTSPERSE 25M, KRAFTSPERSE EDF-450, REAX 100M, REAX 83A, REAX 85A, REAX 88A, REAX 88B, REAX 907, REAX 910, POLYFON H, POLYFON 0 and POLYFON T from Ingevity; AGRINOL DN 19 and Agrinol C12 from Tembec, and d4) surfactants selected from the group consisting of sulfated alkylarylsulfonates and salts thereof, e.g. alkylarylsulfonates and salts thereof such as, for example, AEROSOL OS (from Solvay); AGNIQUE ANS 3DNP-U, AGNIQUE ANS 4DNP, AGNIQUE NSC 2NP-U, NEKAL BX DRY (from BASF); MORWET B, MORWET DB, MORWET EFW, MORWET IP (from Akzo Nobel); OPARYL MT 704, OPARYL MT 800, OPARYL MT 804 (from Bozzetto); RHODACAL BX 78, SUPRAGIL WP (from Solvay); SURFOM HRB (from Oxiteno), and d5) surfactants from the group of the di-/tristyrylphenol ethoxylate phosphates and salts thereof, DISPERSOGEN LFH, DISPERSOGEN TP 160 (from Clariant); LUCRAMUL PPS 16, LUCRAMUL PPS K 16 (from Levaco); PHOSPHOLAN PHB 14 (from Akzo Nobel); SOPROPHOR 3 D 33, SOPROPHOR TS 20-F, SOPROPHOR FL, SOPROPHOR FLK (from Solvay); STEPFAC TSP-PE, STEPFAC TSP PE-K (from Stepan); SURFOM 1323 SC, SURFOM 1325 SC (from Oxiteno); TERSPERSE 2222 (from Huntsman); and from the group of the alcohol ethoxylate phosphates, e.g. EMPIPHOS 03 D (from Akzo Nobel); MULTITROPE 1214, Crodafos series, Atphos 3226 (from Croda); PHOSPHOLAN PE 169 (from Akzo Nobel); RHODAFAC RS-410, RHODAFAC RS-710, RHODAFAC TD 20 F (from Solvay); SERVOXYL VPDZ 20/100 (from Elementis); STEPFAC 8180 (from Stepan); CRAFOL AP261 (from BASF); GERONOL CF/AR (from Clariant).

Further preferably, suitable surfactants are selected from the group comprising surfactants d1), d2), d3), and d4).

Further preferably, suitable surfactants are selected from the group comprising surfactants d1), d2), and d3).

Even further preferably, suitable surfactants are selected from the group comprising surfactants d1) and d2).

More preferably, suitable surfactants are selected from the group comprising surfactants d1).

Very particular preference is given to surfactants from group d1) comprising sodium salts of the copolymers of maleic acid and olefins (e.g. Geropon T/36/Solvay; Duramax D-305/Dow); and sodium salts of copolymers of methacrylic acid and styrene (Tersperse 2700/Huntsman; Atlox Metasperse 500S/Croda); especially sodium salts of the copolymers of maleic acid and olefins (e.g. Geropon T/36).

Suitable surfactants such as Tersperse 2700 are also described in WO 2008036865 A2.

The above-described surfactants can be used either individually or in combination, preference being given to combinations of the surfactants selected from the group of the sodium salts of the copolymers of maleic acid and olefins with salts of sulfated formaldehyde condensation products with alkylaromatics and lignosulfonates and salts thereof.

e. Water-Insoluble Filler

Suitable fillers are preferably chosen from the group comprising e2) synthetic silicates and fumed silicas, such as silicates from the Sipernat®, Aerosil® or Durosil® series (Degussa), the CAB-O-SIL® series (Cabot) or the Van Gel series (R. T. Vanderbilt), and e3) fillers based on synthetic polymers, such as thickeners from the Thixin® or Thixatrol® series (Elementis).

Further preferred are fillers of group e2.

Particular preference is given to fumed silicas as filler e), such as Aerosil products, Aerosil R products and Cab-O-Sil products, and also attapulgites, alone and in mixtures.

f. Solvent

The solvent f) is preferably selected from compounds represented by formula 4,

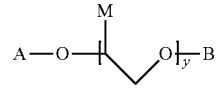

formula 4 wherein
y=1-9
A,B=H, or linear Alkyl
M=H, or Alkyl
Further preferred, f) is selected from compounds represented by formula 4, wherein
y=1-3
A,B=H, or linear Alkyl
M=H, or Alkyl
Even further preferred, f) is selected from compounds represented by formula 4, wherein
y=1-3
A,B=H, or Methyl
M=H, or Methyl Most preferably, f) is selected from compounds represented by formula 4, wherein
y=1-2
if A=H, then B=Methyl, and if A=Methyl, then B=H
M=H, or Methyl Examples of solvent f) are the Dowanol glycol ether products of Dow, or different grades of Polyethylene glycol ethers (e.g. Ethylene glycol monomethyl ether, Ethylene glycol monoethyl ether, Ethylene glycol monopropyl ether, Ethylene glycol monoisopropyl ether, Ethylene glycol monobutyl ether, Ethylene glycol monophenyl ether, Ethylene glycol monobenzyl ether, Diethylene glycol monomethyl ether, Diethylene glycol monoethyl ether, Diethylene glycol monopropyl ether, Diethylene glycol monoisopropyl ether, Diethylene glycol monobutyl ether, Diethylene glycol monophenyl ether, Diethylene glycol monobenzyl ether, Triethylene glycol monomethyl ether, Triethylene glycol monoethyl ether, Triethylene glycol monopropyl ether, Triethylene glycol monoisopropyl ether, Triethylene glycol monobutyl ether, Triethylene glycol monophenyl ether, Triethylene glycol monobenzyl ether)

or different grades of Polypropylene glycol ethers (e.g. Propylene glycol monomethyl ether, Propylene glycol monoethyl ether, Propylene glycol monopropyl ether, Propylene glycol monoisopropyl ether, Propylene glycol monobutyl ether, Propylene glycol monophenyl ether, Propylene glycol monobenzyl ether, Dipropylene glycol monomethyl ether, Dipropylene glycol monoethyl ether, Dipropylene glycol monopropyl ether, Dipropylene glycol monoisopropyl ether, Dipropylene glycol monobutyl ether, Dipropylene glycol monophenyl ether, Dipropylene glycol monobenzyl ether, Tripropylene glycol monomethyl ether, Tripropylene glycol monoethyl ether, Tripropylene glycol monopropyl ether, Tripropylene glycol monoisopropyl ether, Tripropylene glycol monobutyl ether, Tripropylene glycol monophenyl ether, Tripropylene glycol monobenzyl ether)

g. Further Adjuvants

The compositions of the invention comprises further adjuvants g), for example optionally substances from the group of the emulsifiers, the humectants, the foam inhibitors, the preservatives, the dyes, the stabilizers and the antioxidants.

Useful emulsifiers include all customary nonionogenic, anionic, cationic and zwitterionic substances having surface-active properties that are typically used in agrochemical products. These substances include reaction products of fatty acids, fatty acid esters, fatty alcohols, fatty amines, alkylphenols or alkylarylphenols with ethylene oxide and/or propylene oxide and/or butylene oxide and the sulfuric esters thereof, phosphoric monoesters and phosphoric diesters, and also reaction products of ethylene oxide with propylene oxide, and additionally alkylsulfonates, alkyl sulfates, aryl sulfates, tetraalkylammonium halides, trialkylarylammonium halides, alkylamine sulfonates, end group-capped and non-end group-capped alkoxylated linear and branched, saturated and unsaturated alcohols (e.g. butoxy polyethylene-propylene glycols), and polyethylene glycols and polypropylene glycols.

The emulsifiers may be used individually or else in a mixture. Preferred examples include reaction products of castor oil with ethylene oxide in a molar ratio of 1:20 to 1:60, reaction products of C6-C20 alcohols with ethylene oxide in a molar ratio of 1:5 to 1:50, reaction products of C6-C20 alcohols with propylene oxide and ethylene oxide in a molar ratio of 1:1:1 to 1:5:10, reaction products of fatty amines with ethylene oxide in a molar ratio of 1:2 to 1:25, reaction products of 1 mol of phenol with 2 to 3 mol of styrene and 10 to 50 mol of ethylene oxide, reaction products of C8-C12-alkylphenols with ethylene oxide in a molar ratio of 1:5 to 1:30, alkyl glycosides, C8-C16-alkylbenzenesulfonic salts, for example calcium, monoethanolammonium, diethanolammonium and triethanolammonium salts.

Useful humectants are all substances typically usable for this purpose in agrochemical compositions. Preference is given to water-soluble liquids, and examples include glycerol, 1,2-propylene glycol, and dipropylene glycol.

Useful foam inhibitors are all substances typically usable for this purpose in agrochemical compositions. Preference is given to silicone oils, e.g. SAG1572, and magnesium stearate.

Useful antioxidants are all substances typically usable for this purpose in agrochemical compositions. Preference is given to butylhydroxytoluene.

Useful dyes are all substances typically usable for this purpose in agrochemical compositions. Examples include titanium dioxide, pigment black, zinc oxide and blue pigments, and also Permanent Red FGR.

Possible stabilizers used may, for example, be acids or bases. Examples of acids include citric acid, formic acid, acetic acid or boric acid. Examples of bases include sodium salts of carboxylic acids and mono- or poly-alkyl-substituted amines In a preferred embodiment, the invention provides an insecticidal composition comprising:
a. compounds of the formula (I)

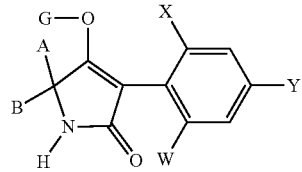

where the compounds of the formula (I) have the following definitions:
W is methyl,
X is chlorine or methyl,
Y is chlorine, bromine or methyl,
A, B and the carbon atom to which they are bonded are saturated C6-cycloalkyl substituted by an alkylenedioxy group which, together with the carbon atom to which it is bonded, forms a 5-membered or 6-membered ketal,
G is hydrogen (a) or is one of the groups

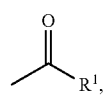

(b)

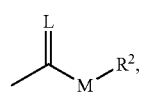

(c)

E, (d)

in which
M is oxygen,
E is one metal ion equivalent or an ammonium ion,

R' is straight-chain or branched $C_1$-$C_4$-alkyl,
R² is straight-chain or branched $C_1$-$C_4$-alkyl.

b. at least one ammonium salt selected from the group comprising ammonium carbonate, ammonium hydrogensulfate, ammonium sulfate (AMS), ammonium hydrogencarbonate, ammonium carbonate and diammonium hydrogenphosphate (DAHP), c. at least one dispersant selected from the group comprising alkyl polypropylene glycol-polyethylene glycol compound of the general formula (III-a)

R—O—A-B—H　　(III-a)

where R is a C1-C4 fragment, preferably a C3-C4 fragment, more preferably a C4 fragment, A is a polypropylene glycol fragment consisting of 10 to 40 propylene oxide (PO) units (formula III-b), preferably consisting of 15-35 PO units, more preferably consisting of 20-30 PO units, B is a randomly copolymerized polyethylene glycol-polypropylene glycol fragment consisting of 10-50 ethylene oxide (EO) units (formula III-c) together with 0-10 propylene glycol (PO) units, preferably consisting of 20-40 EO units together with 0-8 PO units, more preferably consisting of 30-40 EO units together with 0-5 PO units,

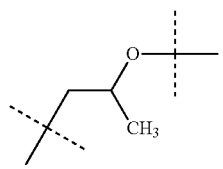

formula III-b

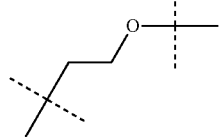

formula III-c and alkyl polypropylene glycol-polyethylene glycol compounds of the general formula (IIId)

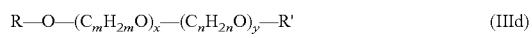

R—O—$(C_mH_{2m}O)_x$—$(C_nH_{2n}O)_y$—R'　　(IIId)

in which the individual radicals and indices have the following definitions:
R and R' are independently hydrogen, a linear $C_1$- to $C_5$-alkyl radical or a branched $C_3$- or $C_4$-alkyl radical;
m is 2 or 3;
n is 2 or 3;
x is 5 to 150; and
y is 5 to 150,
where one radical n or m has the meaning of 2 and the other radical n or m has the meaning of 3, d. at least one surfactant selected from the group comprising polycarboxylate types, salts of sulfated formaldehyde condensation products with alkylaromatics, salts of sulfated formaldehyde condensation products with ditolyl ether, salts of sulfated formaldehyde condensation products with cyclohexanone, lignosulfonates and salts thereof, sulfated alkylarylsulfonates and the salts thereof.

e. at least one filler selected from the group comprising modified natural silicates, silicate minerals, synthetic silicates and fumed silicas, attapulgites and fillers based on synthetic polymers.

f. at least one solvent selected from compounds represented by formula 4, wherein

formula 4 y=1-9
A,B=H, or linear Alkyl
M=H, or Alkyl g. further adjuvants.

In a further-preferred embodiment, the invention provides an insecticidal composition comprising:

a. compound of the formula (I) selected from the following compounds:

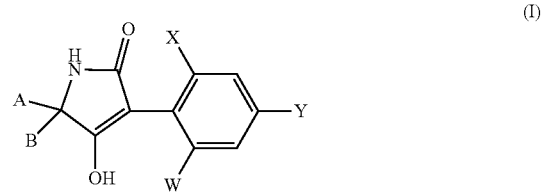

(I)

| W | X | Y | A | B |
|---|---|---|---|---|
| $CH_3$ | $CH_3$ | $CH_3$ | —$(CH_2)_2$—C—$(CH_2)_2$— | O—$(CH_2)_2$—O |
| $CH_3$ | $CH_3$ | Cl | —$(CH_2)_2$—C—$(CH_2)_2$— | O—$(CH_2)_2$—O |
| $CH_3$ | $CH_3$ | Br | —$(CH_2)_2$—C—$(CH_2)_2$— | O—$(CH_2)_2$—O |
| $CH_3$ | $CH_3$ | $CH_3$ | —$(CH_2)_2$—C—$(CH_2)_2$— | O—$(CH_2)_3$—O |
| $CH_3$ | $CH_3$ | Cl | —$(CH_2)_2$—C—$(CH_2)_2$— | O—$(CH_2)_3$—O |
| $CH_3$ | $CH_3$ | Br | —$(CH_2)_2$—C—$(CH_2)_2$— | O—$(CH_2)_3$—O |

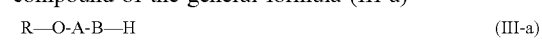

b. at least one ammonium salt selected from the group comprising ammonium carbonate, ammonium hydrogensulfate, ammonium sulfate (AMS), ammonium hydrogencarbonate, ammonium carbonate and diammonium hydrogenphosphate (DAHP), c. at least one dispersant selected from the group comprising alkyl polypropylene glycol-polyethylene glycol compound of the general formula (III-a)

R—O—A-B—H　　(III-a)

where R is a C1-C4 fragment, preferably a C3-C4 fragment, more preferably a C4 fragment, A is a polypropylene glycol fragment consisting of 10 to 40 propylene oxide (PO) units (formula III-b), preferably consisting of 15-35 PO units, more preferably consisting of 20-30 PO units, B is a randomly copolymerized polyethylene glycol-polypropylene glycol fragment consisting of 10-50 ethylene oxide (EO) units (formula III-c) together with 0-10 propylene glycol (PO) units, preferably consisting of 20-40 EO units together with 0-8 PO units, more preferably consisting of 30-40 EO units together with 0-5 PO units, formula III-b

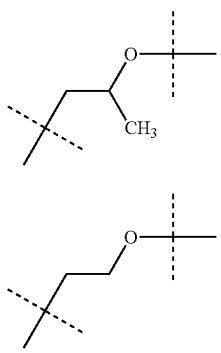

formula III-c

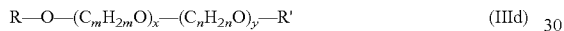

and alkyl polypropylene glycol-polyethylene glycol compounds of the general formula (IIId)

$$R-O-(C_mH_{2m}O)_x-(C_nH_{2n}O)_y-R' \tag{IIId}$$

in which the individual radicals and indices have the following definitions:

R and R' are independently hydrogen, a linear $C_1$- to $C_5$-alkyl radical or a branched $C_3$- or $C_4$-alkyl radical;

m is 2 or 3;
n is 2 or 3;
x is 5 to 150; and
y is 5 to 150,
where one radical n or m has the meaning of 2 and the other radical n or m has the meaning of 3, d. at least one surfactant selected from the group comprising polycarboxylate types, salts of sulfated formaldehyde condensation products with alkylaromatics, salts of sulfated formaldehyde condensation products with ditolyl ether, salts of sulfated formaldehyde condensation products with cyclohexanone, and lignosulfonates and salts thereof, e. at least one filler selected from the group comprising modified natural silicates, silicate minerals, synthetic silicates and fumed silicas, attapulgites and fillers based on synthetic polymers.

f. at least one solvent selected from compounds represented by formula 4, wherein formula 4

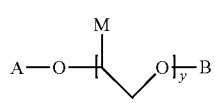

y=1-3
A,B=H, or linear Alkyl
M=H, or Alkyl g. further adjuvants.

In an even further preferred embodiment, the invention provides an insecticidal composition comprising:

a. compound having the formula (I-2) having the following structure:

(I-2)

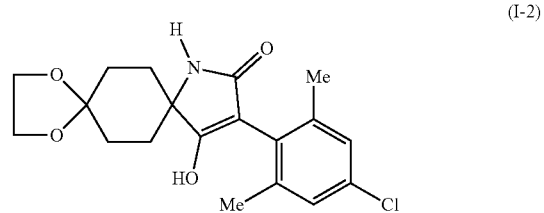 [SMILES: Cc1cc(Cl)cc(C)c1C1=C(O)C2(CCC3(CC2)OCCO3)NC1=O]

b. at least one ammonium salt selected from the group comprising ammonium sulfate (AMS) and diammonium hydrogenphosphate (DAHP), c. at least one dispersant selected from the group comprising alkyl polypropylene glycol-polyethylene glycol compound of the general formula (III-a)

$$R-O-A-B-H \tag{III-a}$$

where R is a C1-C4 fragment, preferably a C3-C4 fragment, more preferably a C4 fragment, A is a polypropylene glycol fragment consisting of 10 to 40 propylene oxide (PO) units (formula III-b), preferably consisting of 15-35 PO units, more preferably consisting of 20-30 PO units, B is a randomly copolymerized polyethylene glycol-polypropylene glycol fragment consisting of 10-50 ethylene oxide (EO) units (formula III-c) together with 0-10 propylene glycol (PO) units, preferably consisting of 20-40 EO units together with 0-8 PO units, more preferably consisting of 30-40 EO units together with 0-5 PO units, formula III-b formula III-c

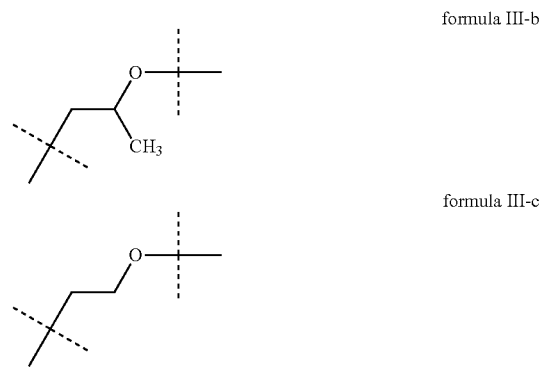

and alkyl polypropylene glycol-polyethylene glycol compounds of the general formula (IIId)

$$R-O-(C_mH_{2m}O)_x-(C_nH_{2n}O)_y-R' \tag{IIId}$$

in which the individual radicals and indices have the following definitions:

R and R' are independently hydrogen, a linear $C_1$- to $C_5$-alkyl radical or a branched $C_3$- or $C_4$-alkyl radical;
m is 2 or 3;
n is 2 or 3;
x is 5 to 150; and
y is 5 to 150,
where one radical n or m has the meaning of 2 and the other radical n or m has the meaning of 3, d. at least one surfactant selected from the group comprising polycarboxylate types, e. at least one filler selected from the group comprising fumed silicas and attapulgites.
f. at least one solvent selected from compounds represented by formula 4, wherein

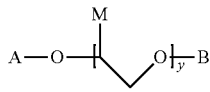

formula 4 y=1-3
A,B=H, or Methyl
M=H, or Methyl
g. further adjuvants.

In a most preferred embodiment, the invention provides an insecticidal composition comprising:

a. compound having the formula (I-2) having the following structure:

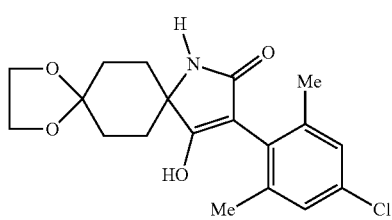

(I-2)

b. at least one ammonium salt selected from the group comprising ammonium sulfate (AMS) and diammonium hydrogenphosphate (DAHP),
c. at least one dispersant selected from the group comprising alkyl polypropylene glycol-polyethylene glycol compound of the general formula (III-a)

R—O-A-B—H     (III-a)

where R is a C1-C4 fragment, preferably a C3-C4 fragment, more preferably a C4 fragment, A is a polypropylene glycol fragment consisting of 10 to 40 propylene oxide (PO) units (formula III-b), preferably consisting of 15-35 PO units, more preferably consisting of 20-30 PO units, B is a randomly copolymerized polyethylene glycol-polypropylene glycol fragment consisting of 10-50 ethylene oxide (EO) units (formula III-c) together with 0-10 propylene glycol (PO) units, preferably consisting of 20-40 EO units together with 0-8 PO units, more preferably consisting of 30-40 EO units together with 0-5 PO units,

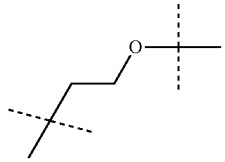

formula III-b

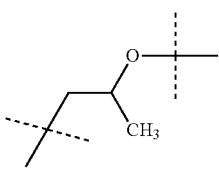

-continued formula III-c and alkyl polypropylene glycol-polyethylene glycol compounds of the general formula (IIId)

R—O—$(C_mH_{2m}O)_x$—$(C_nH_{2n}O)_y$—R'     (IIId)

in which the individual radicals and indices have the following definitions:
R and R' are independently hydrogen, a linear $C_1$- to $C_5$-alkyl radical or a branched $C_3$- or $C_4$-alkyl radical;
m is 2 or 3;
n is 2 or 3;
x is 5 to 150; and
y is 5 to 150,
where one radical n or m has the meaning of 2 and the other radical n or m has the meaning of 3, d. at least one surfactant selected from the group comprising polycarboxylate types,
e. at least one filler selected from the group comprising fumed silicas and attapulgites.
f. at least one solvent selected from compounds represented by formula 4, wherein

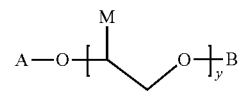

formula 4 y=1-2
if A=H, then B=Methyl, and if A=Methyl, then B=H
M=H, or Methyl
g. further adjuvants.

Compound I-2 is preferably used in the form of its most thermodynamically stable polymorphous structure.

Percentages—unless stated otherwise—should be regarded as percentages by weight, where the % by weight of the compositions add up to 100.

The proportions of the individual components which follow are each based on the total weight of the composition, where the proportion up to 1 litre of the overall composition is made up by component f) (solvent). The proportion of component f) is thus preferably of 1% to 80% by weight, further preferably of 20-60% by weight.

The proportion of the solid active ingredient (component a) in the compositions according to the invention is
preferably 0.5-30% by weight,
further preferably 1-20% by weight, and
more preferably 1-15% by weight,
and most preferred 1.5-5% by weight.

The proportion of the ammonium salt (component b) in the compositions according to the invention is
preferably 1-40% by weight,
further preferably 5-35% by weight, and
more preferably 15-30% by weight.

The proportion of the dispersant (component c) in the compositions according to the invention is
preferably 0.5-40% by weight,
further preferably 5-35% by weight, and more preferably 10-30% by weight.

The proportion of the surfactant (component d) in the compositions according to the invention is
preferably 0-10% by weight,
further preferably 0.3-8% by weight, and
more preferably 0.5-5% by weight.

The proportion of the filler (component e) in the compositions is
preferably 0.1-10% by weight,
further preferably 0.5-10% by weight, and
more preferably 1-5% by weight.

The proportion of the further adjuvants (component g) in the compositions according to the invention is
preferably 0-20% by weight,
further preferably 1-20% by weight,
even further preferably 2.5-17.5% by weight, and
more preferably 5-15% by weight.

A preferred embodiment of the invention is compositions comprising components
a) 0.5-30% by weight
b) 1-40% by weight
c) 0.5-40% by weight
d) 0-10% by weight
e) 0.1-10% by weight
g) 0-20% by weight
f) to one litre.

A further-preferred embodiment of the invention is compositions comprising components
a) 1-20% by weight
b) 5-35% by weight
c) 5-35% by weight
d) 0.3-8% by weight
e) 0.5-10% by weight
g) 1-20% by weight
f) to one litre.

An even further-preferred embodiment of the invention is compositions comprising components
a) 1-20% by weight
b) 5-35% by weight
c) 5-35% by weight
d) 0.3-8% by weight
e) 0.5-10% by weight
g) 2.5-17.5% by weight
f) to one litre.

A more preferred embodiment of the invention is compositions comprising components
a) 1-15% by weight
b) 15-30% by weight
c) 10-30% by weight
d) 0.5-5% by weight
e) 1-5% by weight
g) 5-15% by weight
f) to one litre.

A most preferred embodiment of the invention is compositions comprising components
a) 1.5-5% by weight
b) 15-30% by weight
c) 10-30% by weight
d) 0.5-5% by weight
e) 1-5% by weight
g) 5-15% by weight
f) to one litre.

The present invention further relates to adjuvant combinations for insecticidal active ingredient formulations having at least one active ingredient in solid form for improving the penetration of both active ingredients, comprising b. at least one ammonium salt, and
c. at least one dispersant from the class of the alkyl propoxylated ethoxylates.

In a preferred embodiment, the adjuvant combination further comprises
f. a solvent selected from compounds represented by formula 4, wherein formula 4

$$A-O-\left[\begin{array}{c}M\\ \diagup\diagdown\end{array}O\right]_y B$$

y=1-9
A,B=H, or linear Alkyl
M=H, or Alkyl

The ammonium salt from the adjuvant combination is preferably selected from the group comprising water-soluble inorganic ammonium salts.

Further preferably, b) is selected from the group comprising ammonium carbonate, ammonium hydrogensulfate, ammonium sulfate (AMS), ammonium hydrogencarbonate, ammonium carbonate and diammonium hydrogenphosphate (DAHP).

More preferably, b) is DAHP and AMS.

Component c) (dispersant) of the adjuvant combination is preferably selected from the group comprising alkyl polypropylene glycol-polyethylene glycol compound of the general formula (III-a)

R—O-A-B—H        (III-a)

where R is a C1-C4 fragment, preferably a C3-C4 fragment, more preferably a C4 fragment, A is a polypropylene glycol fragment consisting of 10 to 40 propylene oxide (PO) units (formula III-b), preferably consisting of 15-35 PO units, more preferably consisting of 20-30 PO units, B is a randomly copolymerized polyethylene glycol-polypropylene glycol fragment consisting of 10-50 ethylene oxide (EO-) units (formula III-c) together with 0-10 propylene glycol (PO-) units, preferably consisting of 20-40 EO units together with 0-8 PO units, more preferably consisting of 30-40 EO units together with 0-5 PO units.

formula III-b formula III-c

Examples of "alkyl polypropylene glycol-polyethylene glycol compounds" are:

| Trade name | Manufacturer |
|---|---|
| Antarox B/848 | Solvay |
| Antarox BL-470 | Solvay |
| Antarox BL-480 | Solvay |
| Atlas G 5000 | Croda |
| Atlas G 5002 | Croda |
| Emulsogen 3510 | Clariant |
| Emulsogen EP 4901 | Clariant |
| Ethylan NS 500 K | Akzo Nobel |
| Ethylan NS 500 LQ | Akzo Nobel |
| Ethylan NS 505 K | Akzo Nobel |
| Lucramul AG 411 | Levaco |
| Synergen 848 | Clariant |
| Termul 5429 | Huntsman |
| Tergitol XD | Dow |
| Toximul 8320 | Stepan |
| Toximul 8325 | Stepan |
| Ultraric 5000 | Oxiteno | and the compounds of the general formula (IIId)

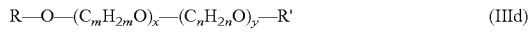

R—O—$(C_mH_{2m}O)_x$—$(C_nH_{2n}O)_y$—R'     (IIId)

in which the individual radicals and indices have the following definitions:
R and R' are independently hydrogen, a linear $C_1$- to $C_5$-alkyl radical or a branched $C_3$- or $C_4$-alkyl radical;
m is 2 or 3;
n is 2 or 3;
x is 5 to 150; and
y is 5 to 150,
where one radical n or m has the meaning of 2 and the other radical n or m has the meaning of 3.

In the context of the present invention, a linear $C_1$- to $C_5$-alkyl radical is understood to mean a methyl radical, an ethyl radical, an n-propyl radical, an n-butyl radical or an n-pentyl radical.

In the context of the present invention, a branched $C_3$- or $C_4$-alkyl radical is understood to mean an isopropyl radical, an isobutyl radical or a tert-butyl radical.

In a preferred embodiment, the R and R' radicals are independently selected from the group consisting of a methyl radical, an n-butyl radical and hydrogen.

In an even more preferred embodiment, the R and R' radicals are independently selected from the group consisting of an n-butyl radical and hydrogen.

With regard to the arrangement of the polyethylene and polypropylene units,
(a) either m may assume the value of 2 and n the value of 3;
(b) or m the value of 3 and n the value of 2.

Preference is given to configuration (b) with m=3 and n=2.

Very particular preference is given to alkyl polypropylene glycol-polyethylene glycol compounds of the formula (IIId) in which
m is 3,
n is 2,
x is 5 to 80,
y is 5 to 80,
R is n-butyl or hydrogen and
R' is hydrogen.

The solvent f) used with the adjuvant combination is further preferably selected from compounds represented by formula 4, wherein

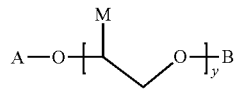

formula 4 y=1-3
A,B=H, or linear Alkyl
M=H, or Alkyl

Even further preferably, f) is selected from compounds represented by formula 4, wherein
y=1-3
A,B=H, or Methyl
M=H, or Methyl Most preferably, f) is selected from compounds represented by formula 4, wherein
y=1-2
if A=H, then B=Methyl, and if A=Methyl, then B=H
M=H, or Methyl A preferred embodiment of the invention is adjuvant combinations having a ratio (based in each case on the mass) of b) to c) of 3:1 to 1:3, preferably of 2:1 to 1:2 and more preferably of 1.3:1 to 1:1.3.

The proportion of the adjuvant combination based on the weight of the overall formulation is preferably
b) 1-40% by weight
c) 1-40% by weight,
further preferably
b) 5-35% by weight
c) 5-35% by weight, and
even further preferably
b) 15-30% by weight
c) 10-30% by weight.

The application rate of the formulations according to the invention can be varied within a relatively wide range. It is guided by the respective active ingredients and by the content thereof in the compositions. The application volume of the formulations according to the invention in aqueous spray solutions can also be varied in a relatively wide range, which means that the applicable spray volume can be varied from 10 to 500 l/ha.

With the aid of the compositions according to the invention, the insecticidal active ingredient mixtures can be deployed in a particularly advantageous manner on plants and/or their habitat.

The compositions according to the invention can be used to treat all plants and parts of plants. Plants in this context are understood to include all plants and plant populations, such as desired and unwanted wild plants or crop plants (including naturally occurring crop plants). Crop plants may be plants which can be obtained by conventional breeding and optimization methods or by biotechnological and genetic engineering methods or combinations of these methods, including the transgenic plants and including the plant cultivars which are protectable or non-protectable by plant breeders' rights. Parts of plants shall be understood to mean all parts and organs of the plants above and below ground, such as shoot, leaf, flower and root, examples given being leaves, needles, stalks, stems, flowers, fruit bodies, fruits and seeds, and also tubers, roots and rhizomes. Plant parts also include harvested material and vegetative and generative propagation material, for example cuttings, tubers, rhizomes, shoots and seeds.

Preferably, the formulations according to the invention are used by spray application against animal pests from the following pest families:

Preference is given from the family of the woolly aphids (Pemphigidae) to: *Eriosoma* spp., Pemphigus spp., in crops such as, for example, citrus fruit, pomaceous fruit, stone fruit, leaf vegetables, root and tuber vegetables and ornamental plants.

Preference is given from the family of the grape lice (Phylloxeridae) to: *Phylloxera* spp. in grapevines, nuts, citrus fruit.

Preference is given from the family of the jumping plant lice (Psyllidae) to: *Psylla* spp., *Paratrioza* spp., *Tenalaphara* spp., Diaphorina spp., *Trioza* spp., in crops such as, for example, pomaceous fruit, stone fruit, citrus fruit, vegetables, potatoes, in tropical crops.

Preference is given from the family of the soft scales (Coccidae) to: *Ceroplastes* spp., *Drosicha* spp., *Pulvinaria* spp., *Protopulminaria* spp., *Saissetia* spp., *Coccus* spp., in perennial crops such as, for example, citrus fruit, pomaceous fruit, stone fruit, olives, grapevines, coffee, tea, tropical crops, ornamental plants, vegetables.

Preference is given from the family of the armoured scale insects (Diaspididae) to: *Quadraspidiotus* spp., *Aonidiella* spp., *Lepidosaphes* spp., *Aspidiotus* spp., *Aspis* spp., *Diaspis* spp., *Parlatoria* spp., *Pseudaulacaspis* spp., *Unaspis* spp., *Pinnaspis* spp., *Selenaspidus* spp., in crops such as, for example, citrus fruit, pomaceous fruit, stone fruit, almonds, pistachios, nuts, olives, tea, ornamental plants, grapevines, tropical crops.

Preference is given from the family of the ensign scales (Ortheziidae) to: *Orthezia* spp. in citrus fruit, pomaceous fruit, stone fruit.

Preference is given from the family of the mealy bugs (Pseudococcidae) to: Pericerga, Pseudococcus spp., *Planococcus* spp., *Dysmicoccus* spp., in crops such as, for example, citrus fruit, stone fruit and pomaceous fruit, tea, grapevines, vegetables, ornamental plants and tropical crops.

Preference is furthermore given from the family of the whiteflies (Aleyrodidae) to: *Bemisia tabaci, Bemisia argentifolii, Trialeurodes vaporariorum, Aleurothrixus floccosus*, Aleurodes spp., *Dialeurodes* spp., Parabemisia myricae in crops such as, for example, vegetables, melons, potatoes, tobacco, soft fruit, citrus fruit, ornamental plants, cotton, soya beans and tropical crops.

Moreover, preference is given from the family of the aphids (Aphidae) to:

*Myzus* spp. in tobacco, stone fruit, soft fruit, fruit vegetables, leafy vegetables, tuber and root vegetables, melons, potatoes, ornamental plants, spices,

*Acyrthosiphon onobrychis* in vegetables,

*Aphis* spp. in tobacco, citrus fruit, pomaceous fruit, stone fruit, melons, strawberries, soft fruit, fruit vegetables, leafy vegetables, tuber, stem and root vegetables, ornamental plants, potatoes, pumpkins, spices, Rhodobium porosum in strawberries,

*Nasonovia ribisnigri* in leafy vegetables,

*Macrosiphum* spp. in ornamental plants, potatoes, leafy vegetables and fruit vegetables, strawberries,

*Phorodon humuli* in hops,

*Brevicoryne brassicae* in leafy vegetables,

*Toxoptera* spp. in citrus fruit, stone fruit, almonds, nuts, spices,

*Aulacorthum* spp. in citrus fruit, potatoes, fruit vegetables and leafy vegetables,

*Anuraphis cardui* in vegetables,

*Brachycaudus helycrisii* in sunflowers,

*Acyrthosiphon onobrychis* in vegetables.

Likewise, preference is given from the family of the *thrips* (Thripidae) to: *Anaphothrips* spp., *Baliothrips* spp., *Caliothrips* spp., *Frankliniella* spp., *Heliothrips* spp., *Hercinothrips* spp., *Rhipiphorothrips* spp., *Scirtothrips* spp., *Kakothrips* spp., *Selenothrips* spp. and *Thrips* spp., in crops such as, for example, fruit, cotton, grapevines, tea, nuts, tropical crops, ornamental plants, conifers, tobacco, spices, vegetables, soft fruit, melons, citrus fruit and potatoes.

Moreover, preference is given from the families of the leaf-miner flies (Agromyzidae) and root-maggot flies (Anthomyiidae) to: *Agromyza* spp., *Amauromyza* spp., *Atherigona* spp., *Chlorops* spp., *Liriomyza* spp., *Oscinella* spp., *Pegomyia* spp. in crops such as, for example, vegetables, melons, potatoes, nuts, ornamental plants.

Preference is given from the families of the leafhoppers (Cicadellidae) and planthoppers (Delphacidae) to: *Circulifer* spp., *Dalbus* spp., *Empoasca* spp., *Erythroneura* spp., *Homalodisca* spp., *Iodioscopus* spp., *Laodelphax* spp., *Nephotettix* spp., *Nilaparvata* spp., *Oncometopia* spp., *Sogatella* spp., in crops such as, for example, citrus fruit, fruit, grapevines, potatoes, vegetables, ornamental plants, conifers, melons, soft fruit, tea, nuts, rice and tropical crops.

Preference is given from the family of the leaf-miner moths (Gracillariidae) to: *Caloptilia* spp., *Gracillaria* spp., *Lithocolletis* spp., *Leucoptera* spp., *Phtorimaea* spp., *Phyllocnistis* spp. in crops such as pomaceous fruit, stone fruit, grapevines, nuts, citrus fruit, conifers, potatoes, coffee.

Preference is given from the family of the gall midges (Cecidomyiidae) to:

*Contarinia* spp., *Dasineura* spp., *Diplosis* spp., *Prodiplosis* spp., *Thecodiplosis* spp., *Sitodiplosis* spp., *Haplodiplosis* spp. in crops such as citrus fruit, pomaceous fruit, stone fruit, vegetables, potatoes, spices, soft fruit, conifers, hops.

Likewise, preference is given from the family of the fruit flies (Tephritidae) to:

*Anastrepha* spp., *Ceratitis* spp., *Dacus* spp., *Rhagoletis* spp. in crops such as vegetables, soft fruit, melons, pomaceous and stone fruit, ornamental plants, potatoes, grapevines, tropical crops, citrus fruit, olives.

Moreover, preference is given to mites from the families of the spider mites (Tetranychidae) and the gall mites (Eriophydae):

*Tetranychus* spp., *Panonychus* spp., *Aculops* spp. in crops such as vegetables, potatoes, ornamental plants, citrus fruit, grapevines, conifers.

The inventive treatment of the plants and parts of plants with the compositions according to the invention is effected directly or by allowing the compositions to act on their surroundings, environment or storage space by the customary treatment methods, for example by drenching, immersion, spraying, evaporation, fogging, scattering, painting on and, in the case of propagation material, in particular in the case of seeds, also by applying one or more coats.

Preferably, the plant to be treated is selected from the group consisting of cotton, soya beans, tobacco, vegetables, spices, ornamental plants, conifers, citrus plants, fruit, tropical crops, nuts and grapevines.

Preferably, the composition according to the invention acts against pests from the families of the woolly aphids, grape lice, jumping plant lice, soft scales, armoured scale insects, ensign scales, mealy bugs, whiteflies, aphids, *thrips*, leafhoppers, planthoppers, leaf-miner flies, gall midges, fruit flies, leaf-miner moths, spider mites, gall mites.

It has also been found that the compositions according to the invention can be produced by a process having the steps of:

1) mixing ingredients (a) to (g) with subsequent homogenization and bead grinding. Relevant equipment for homogenization and bead grinding is known to those skilled in the art.

This process too forms part of the subject-matter of the invention.

Finally, it has been found that the compositions according to the invention are of very good suitability for application of the active agrochemical ingredients present to plants and/or the habitat thereof. This process too forms part of the subject-matter of the invention. The examples which follow illustrate the subject-matter of the invention without limiting it.

Materials Used in the Examples:

Rotational Viscosity is measured according to CIPAC MT 192. Stable and convenient formulations are expected to exhibit medium-ranged viscosities in order to allow for convenient bottle emptying and cleaning.

Rheology was measured using a Bohlin Gemini Rheometer. The measurement of G' (elastic modulus), G" (viscous modulus) and Phase Angle are measured at different frequencies (between 0.01-5 Hz) at room temperature using a frequency sweep routine with ether strain or stress control. Reported figures were taken at 0.5 Hz/20° C. It is generally accepted by people familiar in the art that small Phase Angles and large figures for G' (>G") indicate a high

| Trade name | CAS No. | Manufacturer/supplier | Chemical name |
| --- | --- | --- | --- |
| Geropon T/36 | 37199-81-8 | Solvay | Maleic anhydride 2,4,4-trimethylpentene polymer sodium salt |
| Morwet D-425 | 68425-94-5 | Akzo Nobel | Condensed naphthalene formaldehyde sulfonate, sodium salt |
| Soprophor 3D33 | 90093-37-1 | Solvay | 2,4,6-Tris(1-phenylethyl)phenol polyoxyethylenated-(16EO)-phosphate |
| Soprophor FLK | 99734-09-5 | Solvay | 2,4,6-Tris(1-phenylethyl)phenol polyoxyethylenated-(16EO)-phosphate potassium salt |
| Rhodacal 60 BE | 26264-06-2 | Solvay | Calcium dodecylbenzenesulfonate 60% in 2-ethylhexanol |
| Borresperse NA | 8061-51-6 | Borregard | Lignosulfonic acid, sodium salt |
| Emulsogen EL 400 | 61791-12-6 | Clariant | Castor oil, ethoxylated |
| SAG 1572 | 63148-62-9 | Momentive | Dimethylsiloxane and silicone |
| Antarox B/848 | 9038-95-3 | Solvay | Alkyl propoxylate ethoxylate MW 2600, 48% EO |
| Lucramul HOT 5902 | 64366-70-7 | Levaco | 2-Ethylhexanol propylene-ethylene glycol ether |
| Atlas G5002L | n/a | Croda | Oxirane, methyl-, polymer with oxirane, monobutyl ether |
| Aerosil 380 | 112945-52-5 | Evonik | Fumed amorphous silica/Silicon dioxide, chemical obtained |
| Aerosil R812S | 68909-20-6 | Evonik | Partially hydrophobized fumed amorphous silica |
| Aerosil R805 | 92797-60-9 | Evonik | Silane, trimethoxyoctyl-, hydrolysis product with silicon dioxide |
| Aerosil R972 | 68611-44-9 | Evonik | Silane, dichlorodimethyl-, reaction products with silica |
| Aerosil R106 | 68583-49-3 | Evonik | Cyclotetrasiloxan, Oxtamethyl-, Reaktionspordukte mit Siliciumdioxid |
| Aerosil R202 | 67762-90-7 | Evonik | Reaction products of dimethyl siloxanes and silicones with silica |
| Diammonium hydrogenphosphate (DAHP) | 7783-28-0 | various | (NH4)2HPO4 |
| Ammonium sulfate (AMS) | 7783-20-2 | various | (NH4)2SO4 |
| Glycerol | 56-81-5 | various | CH2(OH)CH(OH)CH2OH |
| 1,2-Propylene glycol | 57-55-6 (racemate) 4254-15-3 (S. enantiomer) 4254-14-2 (R. enantiomer) | various | CH2(OH)CH(CH3)(OH) |
| Dipropylene glycol | 25265-71-8 (mixture of isomers) | various | CH2(OH)CH(CH3)OCH2CH(CH3)OH CH(CH3)(OH)CH2OCH2CH(CH3)OH CH2(OH)CH(CH3)OCH(CH3)CH2OH |

Test and Methods Used in the Examples

Assessment of formulation characteristics takes place analogously to DIN 10964 "Sensory analysis—Simple descriptive test". For this purpose, the samples to be examined are examined visually and, if required, by means of shaking and tilting, for shape, state of matter and colour and further peculiarities (especially, for example, lumps, caking, sediment formation, subsequent thickening, marbling of the sediment etc.).

probability for stable formulations while large Phase Angles and small figures for G' (<G") indicate a high probability for less stable formulations.

Particle size is determined either by laser diffraction according to CIPAC MT 187 Malvern Mastersizer, medium: propylene glycol) or by using an optical microscope (40× magnification). Stable and convenient formulations are expected to contain small particles in order to ensure both good storage stability in concentrate as well as good suspension stability in aqueous dilution.

Agglomeration is determined either by using an optical microscope (40× magnification). Stable and convenient formulations are expected to contain no agglomerates in order to ensure both good storage stability in concentrate as well as good suspension stability in aqueous dilution.

Suspension stability is evaluated following simplified method according to CIPAC MT 180 and is measured in 2% aqueous dilution in CIPAC C or CIPAC D water and determined after 1 hour standing time. Stable and convenient formulations are expected to exhibit no or only very little sediment formation at the bottom of the test vessel in order to ensure a homogeneous application of the spray solution.

Storage stability testing is performed for a given number of weeks (w) at different temperatures such as 0° C., 20° C., 30° C., 40° C., 54° C. or thaw-freeze cycling (=TW; constant temperature change from −15° C. to +30° C. and back within one week).

Redispersability of samples is determined qualitatively by shaking the samples with subsequent assessment of the base of the sample vessel.

Phase separation directly after storage is reported either as sediment fraction and calculated from the quotient H1 [level of the interface layer between sediment phase and supernatant] divided by H0 [total fill height of the sample] or, as in the present case, as supernatant fraction:

Sediment fraction=(H1/H0)*100[%] or

Supernatant fraction=100−sediment content[%]

Stable and convenient formulations are expected to exhibit no or only little phase separation upon storage at elevated temperatures for a prolonged period of time and are easily rehomogenized. Marked phase separation after a short storage time indicates limited storage stability and a significant tendency to formation of sediments that are dispersible only with difficulty, if at all, during storage.

EXAMPLE I

All formulation constituents according to the experiments described in Tables Ia-c are combined in a 25 ml PE screwtop bottle, and 10 g of glass beads (size 1-1.25 mm) are added. The bottle is closed, clamped in an agitator apparatus (Retsch MM301) and treated at 30 Hz for 40 minutes; in the course of this, the samples heat up. After the time has elapsed, the samples are cooled down to room temperature and the consistency of the formulation is assessed. Subsequently, by means of a microscope (Zeiss transmitted light microscope, 40-fold magnification), the particle size is determined by laser dispersion and the dispersion is assessed for its properties. A very small particle size indicates good grindability, while the presence of agglomerates is a sign of poor dispersion characteristics.

TABLE 1

(figures in % by weight)

| | \multicolumn{14}{c}{Example No.} | | | | | | | | | | | | | |
|---|---|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-12 | 1-13 | 1-14 |
| I-2 | 2.00 | 2.00 | 2.00 | 2.00 | 2.00 | 2.00 | 2.00 | 2.00 | 2.00 | 2.00 | 2.00 | 2.00 | 2.00 | 2.00 |
| SAG 1572 | 0.10 | 0.10 | 0.10 | 0.10 | 0.10 | 0.10 | 0.10 | 0.10 | 0.10 | 0.10 | 0.10 | 0.10 | 0.10 | 0.10 |
| DAHP [% w/w] | 20.00 | 20.00 | 20.00 | 20.00 | 20.00 | 20.00 | 20.00 | 20.00 | 20.00 | 20.00 | 20.00 | | | |
| AMS [% w/w] | | | | | | | | | | | | 20.00 | 20.00 | 20.00 |
| Geropon T36 | 1.00 | 5.00 | | | | | | | | 1.00 | 1.00 | 1.00 | 1.00 | 1.00 |
| Morwet D-425 | | | 5.00 | | | | | | | 1.00 | 1.00 | 1.00 | 1.00 | 1.00 |
| Soprophor 3D33 | | | | 5.00 | | | | | | | | | | |
| Soprophor FLK | | | | | 5.00 | | | | | | | | | |
| Rhodacal 60 BE | | | | | | 5.00 | | | | | | | | |
| Borresperse NA | | | | | | | 5.00 | | | | | | | |
| Emulsogen EL 400 | | | | | | | | 5.00 | | | | | | |
| Antarox B/848 | 20.00 | 20.00 | 20.00 | 20.00 | 20.00 | 20.00 | 20.00 | 20.00 | 20.00 | | | 20.00 | | |
| Atlas G5002L | | | | | | | | | | 20.00 | | | 20.00 | |
| Lucramul HOT 5902 | | | | | | | | | | | 20.00 | | | 20.00 |
| Dipropylene Glycol Monomethyl Ether (Dowanol DPM) | 56.90 | 52.90 | 52.90 | 52.90 | 52.90 | 52.90 | 52.90 | 52.90 | 57.90 | 55.90 | 55.90 | 55.90 | 55.90 | 55.90 |
| Concentrate | fluid | fluid | fluid | fluid | fluid | highly viscous | fluid | fluid | highly viscous | fluid | fluid | fluid | fluid | fluid |
| Particle size [d90/50, μm] | 3.9/ 1.5 | 3.0/ 1.5 | 5.6/ 2.3 | 51/ 2.6 | 10/ 3.7 | not possible | 6.8/ 2.2 | 425/ 14 | not possible | 314/ 4.7 | 3.8/ 1.7 | 2.2/ 1.1 | 3.3/ 1.6 | 2.4/ 1.0 |
| Agglomerates [yes/no] | yes | no | yes | yes | yes | yes | no | yes | yes | no | some | no | no | no |

Evaluation of the Experiments:

The formulations based on I-2, ammonium salt and Dowanol DPM with different amounts of surfactants (experiment 1-1, 1-2) show basic grindability of the respective ammonium salts and of I-2 under the experimental conditions specified, but significant agglomeration of the salt crystals in the concentrate is observed under the microscope, unless sufficient surfactant (>1%) is present in the formulation, meaning that the individual particles are dispersed very inadequately, if at all, in the liquid phase. Only certain surfactants are able to properly disperse the ammonium salt and I-2 (e.g. 1-2, 1-7), and alkyl propoxylate ethoxylates are not able to do this on their own, as can be seen by the highly viscous nature of the sample milled only with Antarox B/848 (1-9), as well as the presence of the agglomerates.

Most effective and surprising is the combination of two different surfactants in small amounts (experiments 1-10 to 1-14). This combination (Geropon T-36 and Morwet D-425) is particularly surprising because 1.00% of each surfactant is more most effective in milling and stabilizing DAHP or AMS, than 5.00% of each of the surfactants alone.

EXAMPLE II

For the purpose of testing suitable thickeners and carriers in the presence of suitable dispersing aids, all formulation constituents as specified in Table 2, in Table 3, and in Table 4 are combined and are milled by one of the below mentioned methods:
1) Formulation components are homogenized with a colloidal mill, and subsequently, milled in a bead mill (Dispermat SL50, 80% 2 mm beads, 4000 rpm, circulation grinding for 40 min). After the time has elapsed, the samples are cooled down to room temperature and the rheological properties of the formulation are assessed.
2) Formulation components are mixed in a bottle, which is then closed, clamped in an agitator apparatus (Retsch MM301) and treated at 30 Hz for 40 minutes; in the course of this, the samples heat up. After the time has elapsed, the samples are cooled down to room temperature and the rheological properties of the formulation are assessed.

The rheological properties of the formulation were assessed with a Gemini Rheometer (Bohlin Instruments). The measurement of G' (elastic modulus), G" (viscous modulus) and Phase Angle are measured at different frequencies (between 0.01-5 Hz) at room temperature using a frequency sweep routine with either strain or stress control. The assessment of viscosity is performed at room temperature as per the CIPAC MT192; "Viscosity of Liquids by rotational viscometry" method.

TABLE 2

(figures in % w/w)

| | Example No. | | | | | |
|---|---|---|---|---|---|---|
| | 2-1 | 2-2 | 2-3 | 2-4 | 2-5 | 2-6 |
| I-2 | 2.40 | 2.40 | 2.40 | 2.40 | 2.40 | 2.40 |
| SAG 1572 | 0.10 | 0.10 | 0.10 | 0.10 | 0.10 | 0.10 |
| DAHP | 25.00 | 25.00 | 25.00 | 25.00 | 25.00 | 25.00 |
| Geropon T36 | 1.00 | 0.81 | 0.81 | 0.81 | 0.81 | 0.81 |
| Morwet D-425 | 1.00 | 0.81 | 0.81 | 0.81 | 0.81 | 0.81 |
| Antarox B/848 | 20.00 | 20.00 | 20.00 | 20.00 | 20.00 | 20.00 |
| Aerosil 380 | 4.00 | | | | | |
| Aerosil R812S | | 4.00 | | | | |
| Aerosil R805 | | | 4.00 | | | |
| Aerosil R972 | | | | 4.00 | | |
| Aerosil R106 | | | | | 4.00 | |
| Aerosil R 202 | | | | | | 4.00 |
| Propylene Glycol | 15.00 | 15.00 | 15.00 | 15.00 | 15.00 | 15.00 |
| Dipropylene Glycol Monomethyl Ether (Dowanol DPM) | To 100% | To 100% | To 100% | To 100% | To 100% | To 100% |
| Dynamic viscosity @ shear rate 24/s, 108/s (mPas) at room temperature | 1552/573 | 665/398 | 2622/921 | 1104/365 | 955/304 | Not possible to mill due to very high viscosity |
| G' @ 0.5 Hz (Pa) at room temperature | 182 | 440 | 133 | 39 | 11 | |
| G" @ 0.5 Hz (Pa) at room temperature | 288 | 238 | 234 | 48 | 18 | |
| Phase Angle @ 0.5 Hz (°) at room temperature | 58 | 28 | 60 | 51 | 60 | |

Evaluation of the Experiments in Table 2:

Formulations using Aerosil R812 S (Example No. 2-2) are the only ones with a low Phase angle, this showing that these formulations have a much higher elastic character, and are thus expected to be more stable with respect to sedimentation stability. Additionally, the sedimentation stability of Example 2-2 comes without the high viscosity observed for the other examples, which have much higher dynamic viscosities than example 2-2 at the low shear rate 1/24.

TABLE 3

(figures in % by weight)

| | Example No. | | | | | | | | | | |
|---|---|---|---|---|---|---|---|---|---|---|---|
| | 3-1 | 3-2 | 3-3 | 3-4 | 3-5 | 3-6 | 3-7 | 3-8 | 3-9 | 3-10 | 3-11 |
| I-2 | 2.40 | 2.40 | 2.40 | 2.40 | 2.40 | 2.40 | 2.40 | 2.40 | 2.40 | 2.40 | 2.40 |
| SAG 1572 | 0.10 | 0.10 | 0.10 | 0.10 | 0.10 | 0.10 | 0.10 | 0.10 | 0.10 | 0.10 | 0.10 |
| DAHP | 25.00 | 25.00 | 25.00 | 25.00 | 25.00 | 25.00 | 25.00 | 25.00 | 25.00 | 25.00 | 25.00 |

TABLE 3-continued (figures in % by weight)

| | Example No. | | | | | | | | | | |
|---|---|---|---|---|---|---|---|---|---|---|---|
| | 3-1 | 3-2 | 3-3 | 3-4 | 3-5 | 3-6 | 3-7 | 3-8 | 3-9 | 3-10 | 3-11 |
| Geropon T36 | 1.00 | 1.00 | 1.00 | 1.00 | 1.00 | 0.81 | 0.81 | 0.81 | 0.81 | 0.81 | 0.81 |
| Morwet D-425 | 1.00 | 1.00 | 1.00 | 1.00 | 1.00 | 0.81 | 0.81 | 0.81 | 0.81 | 0.81 | 0.81 |
| Antarox B/848 | 20.00 | 20.00 | 20.00 | 20.00 | 20.00 | 20.00 | 20.00 | 20.00 | 20.00 | 20.00 | 20.00 |
| Aerosil R812S | 4.00 | 4.00 | 4.00 | 4.00 | 4.00 | 2.00 | 2.00 | 2.00 | 2.00 | 2.00 | 2.00 |
| Propylene Glycol | 5.00 | | | 15.00 | 15.00 | | | | 15.00 | | 15.00 | 15.00 |
| Dipropylene Glycol | | 10.00 | | | | | | | | | |
| Glycerin | | | 10.00 | | | | | | | | |
| Dipropylene Glycol Monomethyl Ether (Dowanol DPM) | To 100% | To 100% | To 100% | | | | | | | | |
| 1-methoxy-2-propanol (Dowanol PM) | | | | To 100% | | | | | | | |
| Diethylene Glycol Monomethyl Ether (Methyl Carbitol) | | | | | To 100% | | | | | | |
| PEG 400 | | | | | | To 100% | | | | | To 100% |
| Tripropylene glycol monomethyl ether (Dowanol TPM) | | | | | | | To 100% | To 100% | | | |
| Dipropylene glycol monopropyl ether (Dowanol DPNP) | | | | | | | | | To 100% | To 100% | |
| Dynamic Viscosity @ shear rate 24/s, 108/s (mPas) at room temperature | 382/246 | 634/347 | 1314 (@20/s)/ 537(@100/s) | 440/248 | 932(@20/s)/ 396(@100/s) | 4087/ 1304 | 128/125 | 288/231 | 95/90 | 244/187 | 114/73 |
| G' @ 0.5 Hz (Pa) at room temperature | 75 | 50 | 405 | 174 | 258 | 7121 | 0.06 | 9 | 0.5 | 14 | 94 |
| G" @ 0.5 Hz (Pa) at room temperature | 32 | 25 | 96 | 60 | 83 | 12820 | 0.49 | 7 | 0.7 | 9 | 39 |
| Phase Angle @ 0.5 Hz (°) at room temperature | 23 | 26 | 13 | 19 | 18 | 61 | 82 | 39 | 52 | 34 | 23 |

Evaluation of the Experiments in Table 3:

Formulations using dipropylene glycol monomethyl ether (Examples 3-1, 3-2, 3-3) all show very good rheological properties, namely high elasticity (low phase angle<30°), and shear thinning properties. The formulations containing propylene glycol (Example 3-1) or dipropylene glycol (Example 3-2) have also a relatively low viscosity at low shear rates (<700 mPas @24/s). Other carriers such as 1-methoxy-2-propanol (Exp. 3-4) or diethylene glycol monomethyl ether (Exp. 3-5) also give formulations with low phase angles and in the case of Exp. 3-4 relatively low viscosities at low shear rates. PEG 400 does not yield processable formulations due a very high viscosity (Expt 3-6), but this can be improved by the addition of some propylene glycol (Expt. 3-11), whereby the formulation becomes much more elastic (Phase angle 23° @0.5 Hz), and much more tractable in terms of viscosity (114 mPas @ 24 Hz). Neither tripropylene glycol monomethyl ether (Expt 3-7) nor dipropylene glycol monopropyl ether (Expt 3-9) induce enough elasticity in the formulation so as to expect a stable product towards sedimentation. This can be seen in the very high phase angle)(>45° of the formulations, which indicates a predominantly viscous behaviour. Still, both formulations can be turned into predominantly elastic (phase angle<45°) by the addition of propylene glycol: Expts. 3.8 & 3.10, phase angles @0.5 Hz 39° & 34° respectively.

TABLE 4

(figures in % by weight)

| | Example No. | | | | |
|---|---|---|---|---|---|
| | 4-1 | 4-2 | 4-3 | 4-4 | 4-5 |
| I-2 | 1.20 | 4.80 | 9.60 | 2.40 | 2.40 |
| SAG 1572 | 0.10 | 0.10 | 0.10 | 0.10 | 0.10 |
| DAHP | 25.00 | 25.00 | 25.00 | 25.00 | 25.00 |
| Geropon T36 | 1.00 | 0.81 | 0.81 | 2.50 | 0.50 |
| Morwet D-425 | 1.00 | 0.81 | 0.81 | 2.50 | 0.50 |
| Antarox B/848 | 20.00 | 20.00 | 20.00 | 20.00 | 20.00 |
| Aerosil R812S | 4.00 | 4.00 | 4.00 | 4.00 | 4.00 |
| Propylene Glycol | 15.00 | 15.00 | 15.00 | 15.00 | 15.00 |
| Dipropylene Glycol Monomethyl Ether (Dowanol DPM) | To 100% | To 100% | To 100% | To 100% | To 100% |
| Dynamic Viscosity @ shear rate 24/s, 120/s (mPas) at room temperature | 1267/ 500 | 2112/ 770 | 2415/ 1015 | 1002/ 555 | 631/ 334 |
| G' @ 0.5 Hz (Pa) at room temperature | 13858 | 1044 | 1681 | 177 | 249 |
| G" @ 0.5 Hz (Pa) at room temperature | 5218 | 111 | 16 | 249 | 73 |
| Phase Angle @ 0.5 Hz (°) at room temperature | 21 | 6 | 0.5 | 55 | 16 |

Evaluation of the Experiments in Table 4:

The formulations according to the invention can be manufactured with different amounts of active ingredient without losing their satisfactory rheological properties. Indeed, formulation examples 4-1, 4-2, 4-3 all retain elastic rheological properties (Phase angle<30°) while showing shear thinning behaviour. Additionally, the use of high amounts of surfactants is not necessary to control the rheological behaviour of the formulations, as can be seen by the properties of formulation example 4-4, which shows a high phase angle) (>45° due to the high concentration of the dispersants Geropon T-36 and Morwet D-425. As can be seen in Formulation example 4-5, concentrations of surfactants at the 0.5% range are compatible with high elasticity of the formulation (phase angle 16°), and shear thinning behaviour.

EXAMPLE III

For the purpose of testing the long term stability of the most suitable formulations, suitable thickeners in the presence of suitable dispersing aids as specified in Table 5 are combined and are milled by one of the below mentioned methods:
1) Formulation components are homogenized with a colloidal mill, and subsequently, milled in a bead mill (Dispermat SL50, 80% 2 mm beads, 4000 rpm, circulation grinding for 40 min). After the time has elapsed, the samples are cooled down to room temperature and the rheological properties of the formulation are assessed.
2) Formulation components are mixed in a bottle, which is then closed, clamped in an agitator apparatus (Retsch MM301) and treated at 30 Hz for 40 minutes; in the course of this, the samples heat up. After the time has elapsed, the samples are cooled down to room temperature and the rheological properties of the formulation are assessed.

Subsequently, a storage test is conducted at elevated temperature and then a qualitative/quantitative assessment of appearance, phase separation, rheological properties and dispersion stability after storage (e.g. viscosity), active ingredient concentration is performed The assessment of appearance takes place analogously to DIN 10964 "Sensory analysis—Simple descriptive test". For this purpose, the samples to be examined are examined visually and, if required, by means of shaking and tilting, for shape, state of matter and colour and further peculiarities (especially, for example, lumps, caking, sediment formation, subsequent thickening, marbling of the sediment etc.).

Phase separation directly after storage is reported either as sediment content and calculated from the quotient H1 [level of the interface layer between sediment phase and supernatant] divided by H0 [total fill height of the sample], or as done here by the supernatant content:

Sediment content=$(H1/H0)*100$[%] or

Supernatant content=$100$−sediment content[%]

The rheological properties of the formulation were assessed with a Gemini Rheometer (Bohlin Instruments). The measurement of G' (elastic modulus), G" (viscous modulus) and Phase Angle are measured at different frequencies (between 0.01-5 Hz) at room temperature using a frequency sweep routine with ether strain or stress control. The assessment of viscosity is performed at room temperature as per the CIPAC MT192; "Viscosity of Liquids by rotational viscometry" method.

Dispersion stability in 2% aqueous dilution is determined by analysing the amount of residue deposited after a certain amount of time according to the CIPAC MT 180 Method "Dispersion stability of suspo-emulsions"

TABLE 5

(figures in % by weight)

| | | | Example No. | | |
|---|---|---|---|---|---|
| | 5-1 | 5-2 | 5-3 (comparative example) | 5-4 (comparative example) | 5-5 (comparative example) |
| I-2 | 2.40 | 2.40 | 2.40 | 2.40 | 2.40 |
| Geropon T36 | 1.00 | 1.00 | 1.00 | 1.00 | 1.00 |
| Morwet D-425 | 1.00 | 1.00 | 1.00 | 1.00 | 1.00 |
| Antarox B/848 | 20.00 | 20.00 | 20.00 | 20.00 | 20.00 |
| DAHP | 25.00 | 25.00 | 25.00 | 25.00 | 25.00 |
| SAG 1572 | 0.10 | 0.10 | 0.10 | 0.10 | 0.10 |
| Bentone 34 | — | — | 4.00 | — | — |
| Bentone 38 | — | — | — | 4.00 | — |
| Bentone LT | — | — | — | — | 4.00 |
| Aerosil R812S | 4.00 | 4.00 | — | — | — |
| Propylene Glycol | 15.00 | 10.00 | 15.00 | 15.00 | 15.00 |
| Dipropylene Glycol Monomethyl Ether (Dowanol DPM) | To 100% | To 100% | To 100% | To 100% | To 100% |
| Appearance of Concentrate | | | | | |
| Appearance Concentrate | Flowable light brown dispersion | Flowable light brown dispersion | Flowable light brown dispersion | Flowable light brown dispersion | Flowable light brown dispersion |
| Appearance Concentrate after 2 weeks at 54° C. | — | — | Solid, flows after shaking | Solid, flows after shaking | Flowable light brown dispersion |
| Appearance Concentrate after 4 weeks at room temperature | Flowable light brown dispersion | Flowable light brown dispersion | Solid, flows after shaking | Very thick flowable dispersion | Flowable light brown dispersion |
| Appearance Concentrate after 4 weeks at 54° C. | Flowable light brown dispersion | Flowable light brown dispersion | — | — | — |

TABLE 5-continued (figures in % by weight)

| | Example No. | | | | |
|---|---|---|---|---|---|
| | 5-1 | 5-2 | 5-3 (comparative example) | 5-4 (comparative example) | 5-5 (comparative example) |
| Syneresis/Phase Separation | | | | | |
| Supernatant after 4 W at 54 [%] | 97% | 98% | — | — | — |
| Characterization of the sediment after storage at 54° C. for 4 W | Light brown | Light brown | — | — | — |
| Rehomogenizability after storage at 54° C. for 4 W | Good | Good | — | — | — |
| Supernatant after 4 W storage at room temperature [%] | 97% | 98% | — | — | — |
| Characterization of the sediment after storage at room temperature for 4 w | Light brown | Light brown | — | — | — |
| Rehomogenizability after storage at room temperature for 4 w | Good | Good | — | — | — |
| Rheological Properties | | | | | |
| Dynamic viscosity @ 24 1/s fresh sample [mPa · s] at room temperature | 1600 | 1508 | 890 | 1210 | 406 |
| Dynamic viscosity @ 108 1/s fresh sample [mPa · s] at room temperature | 597 | 585 | 437 (@121 1/s) | 531 (@121 1/s) | 309 (@121 1/s) |
| Dynamic viscosity @ 24 1/s after 2 W storage @ 54° C. [mPa · s] at room temperature | — | — | 1572 | 2321 | — |
| Dynamic viscosity @ 108 1/s after 2 W storage @ 54° C. [mPa · s] at room temperature | — | — | 689 (@121 1/s) | 919 (@121 1/s) | — |
| Dynamic viscosity @ 24 1/s after 4 W storage @ 54° C. [mPa · s] at room temperature | 363 | 293 | — | — | — |
| Dynamic viscosity @ 108 1/s after 4 W storage @ 54° C. [mPa · s] at room temperature | 276 | 214 | — | — | — |
| Dynamic viscosity @ 24 1/s after 4 W storage @ room temperature [mPa · s] at room temperature | 505 | 450 | 2326 | 3682 | 1693 |
| Dynamic viscosity @ 108 1/s after 4 W storage @ room temperature [mPa · s] at room temperature | 323 | 293 | 934 (@121 1/s) | 1334 (@121 1/s) | 679 (@121 1/s) |
| G' @ 0.5 Hz (Pa) at room temperature, fresh sample | 30 | 6355 | 223 | 178 | 2.2 |
| G" @ 0.5 Hz (Pa) at room temperature, fresh sample | 468 | 7387 | 68 | 49 | 3.2 |
| Phase Angle @ 0.5 Hz (°) at room temperature, fresh sample | 86 | 49 | 17 | 15 | 55 |
| G' @ 0.5 Hz (Pa) at room temperature after 2 W storage @ 54° C. | — | — | 940 | 1117 | 843 |

TABLE 5-continued (figures in % by weight)

| | Example No. | | | | |
|---|---|---|---|---|---|
| | 5-1 | 5-2 | 5-3 (comparative example) | 5-4 (comparative example) | 5-5 (comparative example) |
| G" @ 0.5 Hz (Pa) at room temperature after 2 W storage @ 54° C. | — | — | 83 | 94 | 21 |
| Phase Angle @ 0.5 Hz (°) at room temperature after 4 W storage @ 54° C. | — | — | 5 | 5 | 1 |
| G' @ 0.5 Hz (Pa) at room temperature after 4 W storage @ 54° C. | 15 | 6 | — | — | — |
| G" @ 0.5 Hz (Pa) at room temperature after 4 W storage @ 54° C. | 15 | 8 | — | — | — |
| Phase Angle @ 0.5 Hz (°) at room temperature after 4 W storage @ 54° C. | 46 | 53 | — | — | — |
| G' @ 0.5 Hz (Pa) at room temperature after 4 W storage @ room temperature, fresh sample | 155 | 76 | 1040 | 1460 | 801 |
| G" @ 0.5 Hz (Pa) at room temperature after 4 W storage @ room temperature, fresh sample | 63 | 50 | 79 | 277 | 27 |
| Phase Angle @ 0.5 Hz (°) @ room temperature after 4 W storage @ room temperature | 22 | 33 | 4 | 11 | 2 |
| Dispersion Stability (2% formulation, CIPAC C Water, room temperature) | | | | | |
| Dispersion stability after 1 h fresh sample [mL] | 0.05 | 0.05 | 7 | 3 | 1 |
| Dispersion stability after 1 h after 2 W storage @ 54° C. [mL] | — | — | 7 | 9 | 3 |
| Dispersion stability after 1 h after 4 W storage @ 54° C. [mL] | 0 | 0.05 | — | — | — |
| Dispersion stability after 1 h after 4 W storage @ room temperature [mL] | 0.1 | 0.1 | 8 | 5 | 2 |

Evaluation of the experiments in Table 5:

Using fillers such as Aerosil R812S and different combination of propylene glycol/dipropylene glycol monomethyl ether it is possible to produce stable formulations having different viscosities (Recipes 5-1, 5-2). Indeed, both recipes are stable during storage and show very good sedimentation stability. After storage of the formulations after 4 weeks at room temperature or at 54° C., the phase separation observed of both examples 5-1 and 5-2 is very small.

Both examples 5-1 and 5-2 develop during storage at room temperature a considerably more elastic rheological behaviour. This is visible as the initially high phase angle becomes, after 4 weeks at room temperature, substantially smaller)(<35°. An increased elastic rheological behaviour translates in increased sedimentation stability. Particularly beneficial is that example 5-1 behaves more elastic (and thus more stable) than example 5-2 without a proportional viscosity increase.

A further factor for ascertaining formulation stability is the dispersion stability of the formulation in aqueous dilution. Both examples 5-1, 5-2 are dispersable in water, and after storage at room temperature or at 54° C. in some cases the phase separation of the diluted formulation is relatively small (<=0.1 mL).

The use of fillers other than the silica based Aerosil R812S leads to formulations with significant disadvantages. This is exemplified with the comparative examples 5-3, 5-4, 5-5 which make use respectively of the organoclay based fillers Bentone 34, Bentone 38, Bentone LT. The use of these organoclay fillers result in the case of 5-3 and 5-4 in formulations with very high viscosities, which increase during storage. The viscosity increase eventually results in the comparative examples 5-3 and 5-4 becoming at some point during storage solid, and only flowable after vigorous shaking.

Additionally, the dispersion stability behaviour of the comparative examples 5-3, 5-4, 5-5 is significantly worse than that of the examples according to the invention 5-1 and 5-2. Indeed, 1 hour after dispersion in water, the comparative examples have produced a large amount of sediment, whereas the examples according to the invention have barely settled any insoluble material. This an advantage for the examples according to the invention because, for instance, the insoluble residues produced by the comparative examples e.g. can clog application equipment, or negatively affect the bioavailability of the active ingredient.

In conclusion, the silica fillers (examples according to the invention) and the organoclay fillers (comparative example) have different technical properties, and the examples according to the invention have significant advantages in viscosity and handling, as well as in the usability of the formulation upon dispersion in water. Additionally, the use of fumed silicas lead to stable formulations (very limited phase separation during storage) without the very large viscosity measured for some of the comparative examples. Therefore, the use of silica fillers in the examples according to the invention in Table 5 is an improvement over the comparative examples based on organoclay fillers in Table 5.

The invention claimed is:

1. A composition comprising:
   a) at least one active ingredient comprising a compound of formula (1-2)

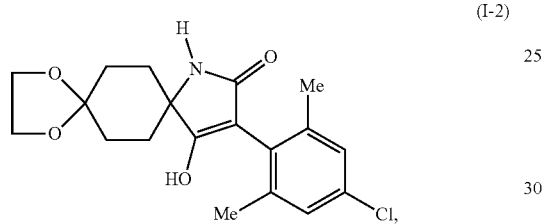

(I-2)

b) at least one ammonium salt,
   c) at least one dispersant comprising an alkyl propoxylate ethoxylate,
   d) optionally one or more surfactants,
   e) at least one filler selected from the group consisting of synthetic silicates and fumed silicas,
   f) at least one solvent that is a compound of formula 4, wherein:

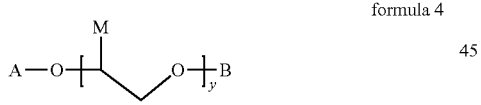

formula 4 y is 1 or 2,
   A is hydrogen and B is methyl, or A is methyl and B is hydrogen,
   M is hydrogen or methyl
   and
   g) optionally one or more further adjuvants,
   wherein active ingredient a) is insoluble or only slightly soluble in the chosen solvent f).

2. The composition according to claim 1, wherein d) is obligatory.

3. The composition according to claim 1, wherein b) the at least one ammonium salt is selected from the group consisting of ammonium carbonate, ammonium hydrogensulfate, ammonium sulfate, ammonium hydrogencarbonate, ammonium carbonate and diammonium hydrogen-phosphate.

4. A method of controlling one or more insects comprising applying the composition according to claim 3 or dilution thereof to soil and/or a plant.

5. The composition according to claim 1, wherein c) the at least one dispersant is selected from the group consisting of alkyl polypropylene glycol-polyethylene glycol compounds of formula (III-a)

(III-a)

wherein R in formula (III-a) is a C1-C4 fragment,
A in formula (III-a) is a polypropylene glycol fragment consisting of 10 to 40 propylene oxide (PO) units (formula III-b),

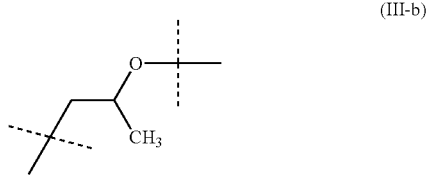

(III-b)

B in formula (III-a) is a randomly copolymerized polyethylene glycol-polypropylene glycol fragment consisting of 10-50 ethylene oxide (EO) units (formula III-c) together with 0-10 propylene oxide (PO) units

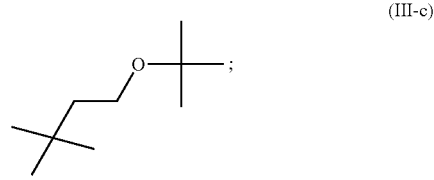

(III-c)

and alkyl polypropylene glycol-polyethylene glycol compounds of formula (III-d)

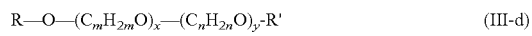

(III-d)

wherein:
R and R' in formula (III-d) are independently hydrogen, a linear C1 to C5-alkyl radical or a branched C3 or C4-alkyl radical;
m in formula (III-d) is 2 or 3;
n in formula (III-d) is 2 or 3;
x in formula (III-d) is 5 to 150; and
y in formula (III-d) is 5 to 150,
wherein one radical n or m has the meaning of 2 and the other radical n or m has the meaning of 3.

6. A method of controlling one or more insects comprising applying the composition according to claim 5 or dilution thereof to soil and/or a plant.

7. The composition according to claim 1, wherein d) the optionally one or more surfactants is selected from the group consisting of polycarboxylate types, salts of sulfated formaldehyde condensation products with alkylaromatics, salts of sulfated formaldehyde condensation products with ditolyl ether, salts of sulfated formaldehyde condensation products with cyclohexanone, and lignosulfonates and salts thereof.

8. A method of controlling one or more insects comprising applying the composition according to claim 7 or dilution thereof to soil and/or a plant.

9. The composition according to claim 1, wherein the components are present as follows:
   a) 0.5-30% by weight
   b) 1-40% by weight
   c) 0.5-40% by weight d) 0-10% by weight
e) 0.1-10% by weight
g) 0-20% by weight
f) to one litre.

10. The composition according to claim 1, wherein the components are present as follows:
a) 1-20% by weight
b) 5-35% by weight
c) 5-35% by weight
d) 0.3-8% by weight
e) 0.5-10% by weight
g) 1-20% by weight
f) to one litre.

11. The composition according to claim 1, comprising;
a) compound having formula (I-2) having the following structure:

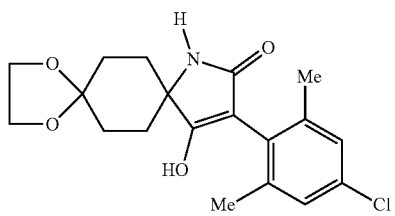
(I-2)

b) at least one ammonium salt selected from the group consisting of ammonium sulfate and diammonium hydrogenphosphate,
c) at least one dispersant selected from the group consisting of alkyl polypropylene glycol-polyethylene glycol compounds of formula (III-a)

(III-a)

wherein R in formula (III-a) is a C1-C4 fragment,
A in formula (III-a) is a polypropylene glycol fragment consisting of 10 to 40 propylene oxide (PO) units (formula III-b),

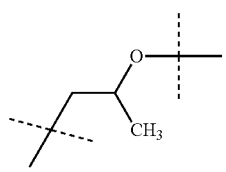
(III-b)

B in formula (III-a) is a randomly copolymerized polyethylene glycol-polypropylene glycol fragment consisting of 10-50 ethylene oxide (EO) units (formula III-c) together with 0-10 propylene oxide (PO) units,

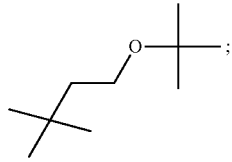
(III-c)

and alkyl polypropylene glycol-polyethylene glycol compounds of formula (III-d)

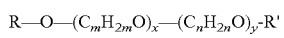
(III-d)

wherein:
R and R' in formula (III-d) are independently hydrogen, a linear C1 to C5-alkyl radical or a branched C3 or C4-alkyl radical;
m in formula (III-d) is 2 or 3;
n in formula (III-d) is 2 or 3;
x in formula (III-d) is 5 to 150; and
y in formula (III-d) is 5 to 150,
wherein one radical n or m has the meaning of 2 and the other radical n or m has the meaning of 3,
d) at least one surfactant comprising a polycarboxylate,
e) at least one filler comprising fumed silicas,
f) at least one solvent selected from compounds represented by formula 4, wherein:

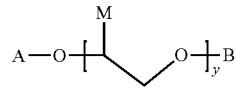
formula 4 y is 1 or 2,
A is hydrogen and B is methyl, or A is methyl and B is hydrogen,
M is hydrogen or methyl
g) optionally one or more further adjuvants.

12. A product comprising a composition according to claim 1 for controlling insects.

13. A method of controlling one or more insects comprising applying the composition according to claim 1 or dilution thereof to soil and/or a plant.

14. A method of controlling one or more insects comprising applying the composition according to claim 11 or dilution thereof to soil and/or a plant.

* * * * *